US011294531B2

(12) United States Patent
Clemons

(10) Patent No.: US 11,294,531 B2
(45) Date of Patent: *Apr. 5, 2022

(54) GAMING VIDEO PROCESSING SYSTEM

(71) Applicant: Christopher Konopka, St. James, NY (US)

(72) Inventor: Christopher Anthony Clemons, Las Vegas, NV (US)

(73) Assignee: Christopher Konopka, St. James, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,168

(22) Filed: Aug. 8, 2019

(65) Prior Publication Data

US 2019/0361573 A1   Nov. 28, 2019

Related U.S. Application Data

(63) Continuation of application No. 14/724,549, filed on May 28, 2015, now Pat. No. 10,474,311.

(51) Int. Cl.
| | |
|---|---|
| *A63F 13/30* | (2014.01) |
| *G06F 3/0481* | (2022.01) |
| *A63F 13/54* | (2014.01) |
| *A63F 13/825* | (2014.01) |
| *A63F 13/27* | (2014.01) |

(Continued)

(52) U.S. Cl.
CPC ............ *G06F 3/0481* (2013.01); *A63F 13/27* (2014.09); *A63F 13/28* (2014.09); *A63F 13/30* (2014.09); *A63F 13/54* (2014.09); *A63F 13/825* (2014.09); *G06F 3/1446* (2013.01);

*G07F 17/32* (2013.01); *G07F 17/3211* (2013.01); *H04N 9/3147* (2013.01)

(58) Field of Classification Search
None
See application file for complete search history.

(56) References Cited

U.S. PATENT DOCUMENTS

| 6,088,004 A | 7/2000 | Domae |
|---|---|---|
| 6,508,709 B1 | 1/2003 | Karmarkar |

(Continued)

FOREIGN PATENT DOCUMENTS

| CN | 103558921 | 2/2014 |
|---|---|---|
| CN | 104394400 | 3/2015 |

OTHER PUBLICATIONS

PCT/US2016/033300, filed May 19, 2016, International Search Report and Written Opinion, 21 pages.

*Primary Examiner* — Yanna Wu
(74) *Attorney, Agent, or Firm* — Rimon Law, P.C.

(57) ABSTRACT

A video control, projection and display system is employed in a gaming establishment and used in conjunction with or without a gaming network or gaming components. The control system includes projection cameras or light sources which may generate and display images associated with the electronic gaming machines or with a player of the electronic gaming machines. The control system enhances the image by using pixel cloning, image blending pixel scaling, pixel movement, and pixel masking. The projection system may generate holographic images and may project images onto a variety of surfaces adjacent to the electronic gaming machines. The control system manages devices associated with the projection and display system.

20 Claims, 23 Drawing Sheets

(51) Int. Cl.
  *G07F 17/32* (2006.01)
  *A63F 13/28* (2014.01)
  *G06F 3/14* (2006.01)
  *H04N 9/31* (2006.01)

(56) References Cited

U.S. PATENT DOCUMENTS

| | | | |
|---|---|---|---|
| 6,712,695 B2 | 3/2004 | Mothwurf et al. | |
| 6,827,448 B2 | 12/2004 | Cimini | |
| 7,432,803 B2 | 10/2008 | Fails et al. | |
| 7,800,628 B2 | 9/2010 | Harville | |
| 7,867,085 B2 | 1/2011 | Pryzby et al. | |
| 8,002,619 B2 | 8/2011 | Gagner et al. | |
| 8,152,631 B2 | 4/2012 | Anderson | |
| 8,235,804 B2 | 8/2012 | Gagner | |
| 8,469,813 B2 | 6/2013 | Joshi et al. | |
| 8,545,326 B2 | 10/2013 | Underdahl et al. | |
| 8,635,126 B2 | 1/2014 | Risnoveanu et al. | |
| 8,672,486 B2 | 3/2014 | Travis | |
| 8,864,567 B2 | 10/2014 | Underdahl et al. | |
| 9,117,335 B2 | 8/2015 | Crowder | |
| 9,520,030 B2 | 12/2016 | Gagner | |
| 2003/0220139 A1 | 11/2003 | Peterson | |
| 2006/0009285 A1* | 1/2006 | Pryzby | G07F 17/32 463/30 |
| 2006/0279815 A1 | 12/2006 | Rathus et al. | |
| 2007/0218974 A1 | 9/2007 | Patel et al. | |
| 2008/0020814 A1 | 1/2008 | Kernene | |
| 2009/0029762 A1 | 1/2009 | Tsukahara | |
| 2009/0082095 A1 | 3/2009 | Walker et al. | |
| 2009/0118022 A1 | 5/2009 | Lyons et al. | |
| 2009/0238378 A1 | 9/2009 | Kikinis et al. | |
| 2011/0223993 A1 | 9/2011 | Allen et al. | |
| 2011/0306400 A1 | 12/2011 | Nguyen | |
| 2012/0094737 A1* | 4/2012 | Barclay | G07F 17/34 463/20 |
| 2012/0129601 A1 | 5/2012 | Gronkowski et al. | |
| 2014/0104582 A1* | 4/2014 | Mori | H04N 9/3182 353/30 |
| 2014/0243070 A1* | 8/2014 | Crowder | G07F 17/3213 463/20 |

\* cited by examiner

GAMING VIDEO PROCESSING SYSTEM

CROSS-REFERENCE TO RELATED APPLICATION

This application is a continuation patent application of U.S. Non-provisional patent application Ser. No. 14/724,549, filed May 28, 2015, and titled "Video Game Processing System," the disclosure of which is hereby incorporated herein by reference in its entirety.

TECHNICAL FIELD

The embodiments relate to video systems. More particularly, the embodiments relate to video mapping and processing systems to display or project images onto a surrounding environment. In still greater particularity, the embodiments relate to a video mapping system that displays or projects images in a gaming environment. By way of further characterization, but not by way of limitation thereto, the embodiments project casino content information relating to gaming activities onto a surrounding environment to enhance a player's gaming experience.

BACKGROUND

Wagering has been popular for centuries. In more recent times, gaming establishments such as casinos have sought to improve the gaming experience for customers. Casinos and other gaming entities utilize various types of gaming machines such as slot machines, video poker machines and the like. The slot machine games in today's industry are becoming mundane and player participation could increase if the entire gaming environment was designed to be more exciting by improving the player's sensory experience. Improved visual imaging in particular could be very popular as a method to attract additional player activity in gaming establishments as existing gaming systems have limited display capabilities. Enhanced visual imaging could make such systems more engaging for the players and, in particular, for younger players who are accustomed to the competitive environment associated with interactive games played on the internet.

The financial success of a gaming establishment such as a casino is directly tied to its ability to attract customers. One effective method to attract additional players is to provide those players with a more exciting sensory experience. Such improvements enhance the experience for the players and provide the gaming establishment with a competitive advantage over other gaming establishments with more conventional gaming experiences. Audio-visual systems could be improved to make the game more engaging and interactive for the players, and to enhance the casino tournament atmosphere.

SUMMARY

Embodiments disclosed herein solve the previously stated problems by creating an interactive and exciting environment with the use of a video projection mapping processor and server to project progressive jackpot information from the individual electronic gaming machines and a gaming network onto the walls surrounding the players. The disclosed systems build an engaging environment for the individual player and also create an interactive and competitive setting which captures the players' attention for longer periods of time.

Embodiments disclosed herein allow for the information from the individual casino gaming signage to be consolidated into a server that is then projected onto the surrounding wall or environment using the video projection mapping processor/server and pixel manipulation techniques. In one embodiment, pixel manipulation and video projection mapping are used to transfer the currently displayed progressive jackpot information from the screens of slot machines or casino storage servers onto the surrounding environment creating a more interactive and engaging experience for the player. In other embodiments, various environments could be created in the gaming venue depending upon player identification, seasons of the year, particular holidays, or player preference.

The embodiments described herein also employ pixel cloning, scaling, movement, layering, and masking along with edge blending projectors to create the visual effects described herein by projecting information from the electronic gaming machine display or from casino servers to the projectors or LED (including OLED, LCD, CRT and plasma) video panels for display on the casino walls or other surrounding environment. Pixel projection mapping may also be used to make a feature or an object look like something else. In total, an audio-visual system simulates an alternate environment to make the gaming player feel as though he or she is transported into a unique environment which may enhance the player's experience.

Embodiments of the video mapping system can interface with the gaming network of the casino or on a stand-alone basis without interfacing with the casino network. Some embodiments include tournament slot machines, casino slot tournaments, and bingo and keno terminals as well as non-gaming machines such as ATM terminals. The system can also view a Dynamic Data Stream like xml via a TCPIP gaming and a non-gaming network to display progressive gaming amounts, jackpot gaming amounts, or any other dynamic text stream the venue would like to display (i.e. birthdays or anniversaries associated with a player etc.).

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
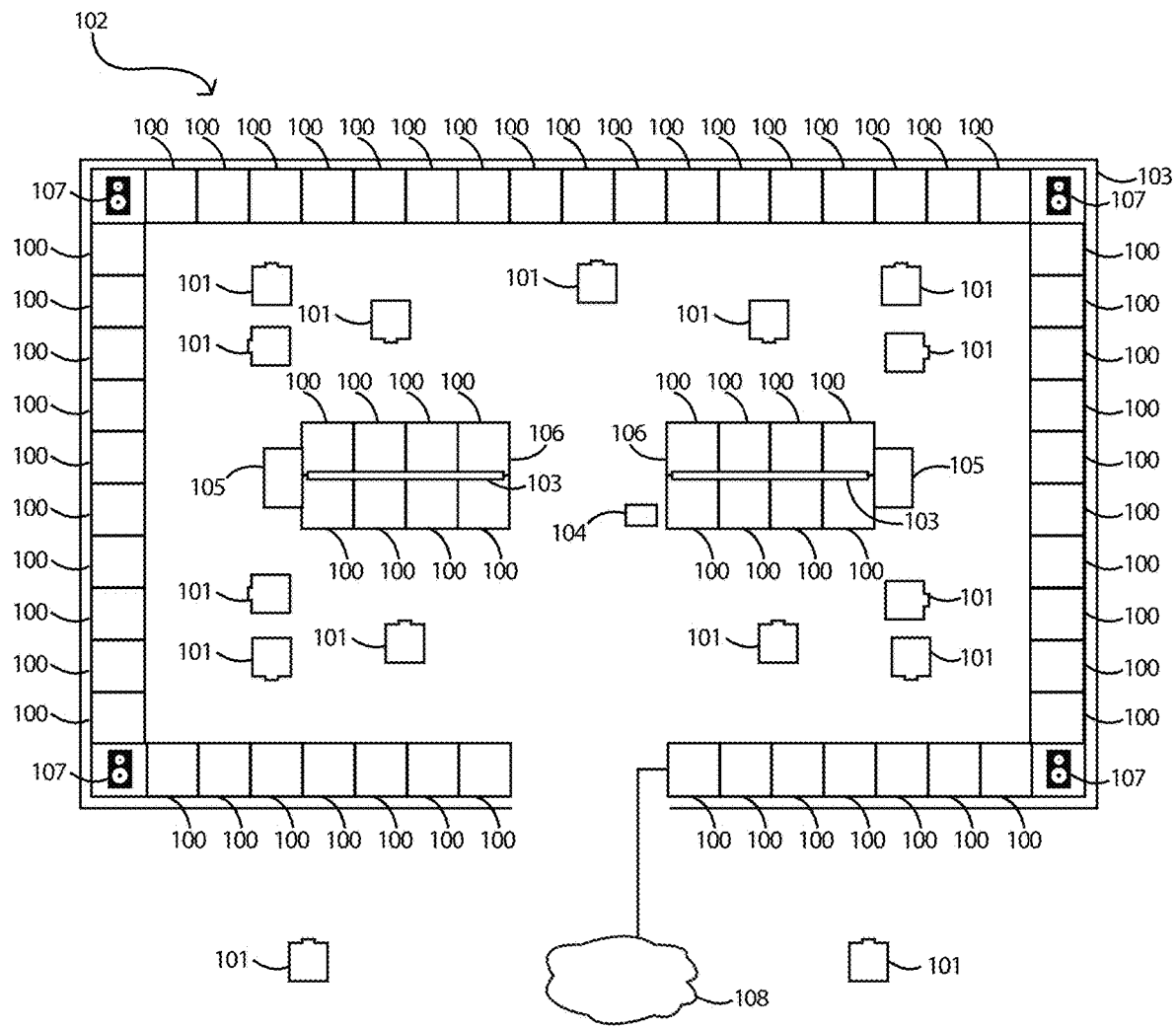
FIG. 1 shows a top view of a gaming venue with one embodiment of a video projection system.

Reference will now be made in detail to representative embodiments illustrated in the accompanying drawings wherein like reference numerals denote like structure throughout each of the various figures. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. These and other embodiments are discussed below with reference to FIGS. 1-28.

Referring to FIG. 1, a top view of a floor layout for a casino slot machine gaming venue is shown. A plurality of electronic gaming machines 100 are distributed in a venue which may be a room 102 including walls 103. A plurality of video projectors 101 may be located adjacent to electronic gaming machines 100. In some embodiments, video projectors 101 may be located in or on the ceiling or in or on the walls or the floor. Video projectors 101 may project images onto walls 103 or other projection surfaces as will be described below. Electronic gaming machines 100 may be located around the periphery of gaming room 102 and/or in banks 106 distributed around the floor of room 102. One or more audio speakers 107 may be located in various locations around the room such as in the corners of the room. These speakers may be located on the floor, ceiling or mounted on the walls 103. In some embodiments, displays 105 which may include display screens are located adjacent banks 106 to provide a casino operator with the opportunity to advertise or otherwise provide information to prospective or current gaming customers.

Electronic gaming machines 100 may each be connected to a gaming network 108 operated by the gaming establishment. In some embodiments, a touchscreen 104 may be included in, or adjacent to, room 102. This touchscreen is connected to the gaming establishment control network and allows monitoring of the projectors 101 and other components of the system for maintenance or various other functions. For example, an employee of the gaming establishment could vary the gaming scenario depending upon the desires of the gaming establishment or the gaming customers. While touchscreen 104 is shown in room 102, it should be understood that this control component may be hidden in a closet, above the ceiling, or otherwise screened from view of the gaming customers. The status of the system may be monitored and controlled through this device. For example, alerts may be provided to inform a manager that one or more of video projectors 101 is, or is about to become, defective. These alerts could be sent to a portable electronic device such as a smartphone by email or text and could also be sent to a pager. In some embodiments, different gaming themes may be presented by the projectors and sound system either in a timed schedule or in a manually selected manner depending upon the preference of the gaming customers and/or the casino operator.

Figure 2:
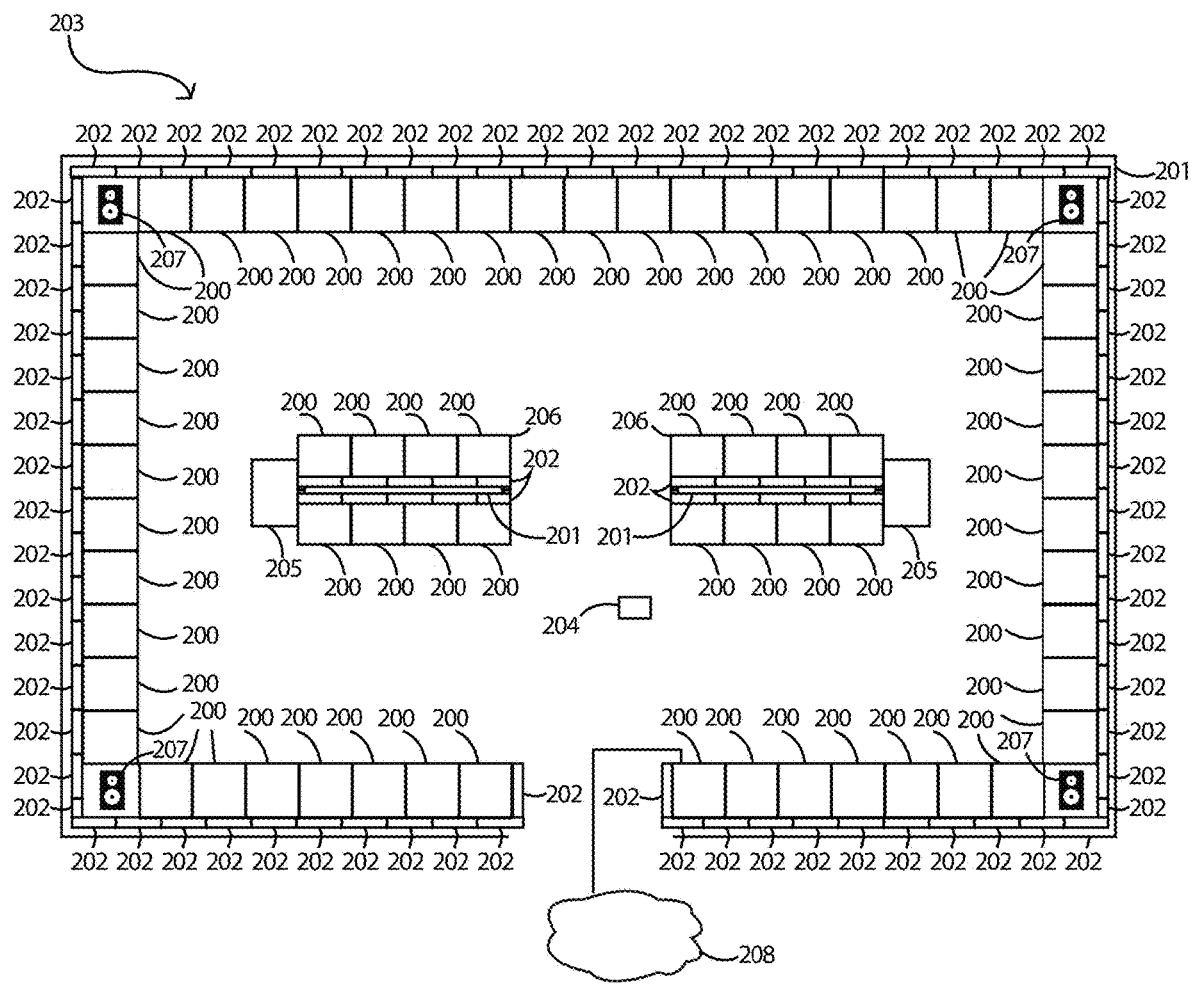
FIG. 2 shows a top view of a gaming venue with an alternate embodiment of a video projection system.

Referring to FIG. 2, a top view of an alternate embodiment of a floor layout for a casino slot machine gaming venue is shown. A plurality of electronic gaming machines 200 are distributed in a venue such as a room or area 203 including walls 201. Walls 201 include light emitting diode (LED) or liquid crystal (LCD) or organic LED (OLED) or plasma or cathode ray tube (CRT) video display devices 202. Video display devices 202 are included in this embodiment in place of video projectors 101 from FIG. 1. Electronic gaming machines 200 may be located along walls 201 around the periphery of the gaming venue and/or in banks 206 distributed around the floor of the gaming venue. Video display devices 202 may be located adjacent banks 206 as well as on walls 201. One or more audio speakers 207 may be located in various locations around the venue such as in the corners of the venue. These speakers may be located on the floor, ceiling or mounted on the walls 201. In some embodiments, displays 205 which may include display screens are located adjacent banks 206 to provide a casino operator with the opportunity to advertise or otherwise provide information to prospective or current gaming customers.

The electronic gaming machines 200 may each be connected to a gaming network 208 operated by the gaming establishment. In some embodiments, a touchscreen 204 may be included in or adjacent to room 203. This touchscreen is connected to the gaming establishment control network and allows monitoring of the video display devices 202 and other components of the system such as the audio system 207 for maintenance or various other functions. For example, an employee of the gaming establishment could vary the gaming scenario depending upon the desires of the gaming establishment or the gaming customers. While touchscreen 204 is shown in room 203 it should be understood that this control component may be hidden in a closet, above the ceiling, or otherwise located on the casino premises and screened from view of the gaming customers. The status of the system may be monitored and controlled through this touchscreen 204. Touchscreen 204 could also be used for troubleshooting the system. Alerts may be provided by the system to a casino operator informing employees that one of more of video display devices 202 is, or is about to become, defective. These alerts could be sent to a portable electronic device such as a smartphone by email or text and could also be sent to a pager. In some embodiments, different gaming themes may be presented by the video display devices and the audio system either in a timed schedule or in a manually selected manner depending upon the preference of the casino operator.

Figure 3:
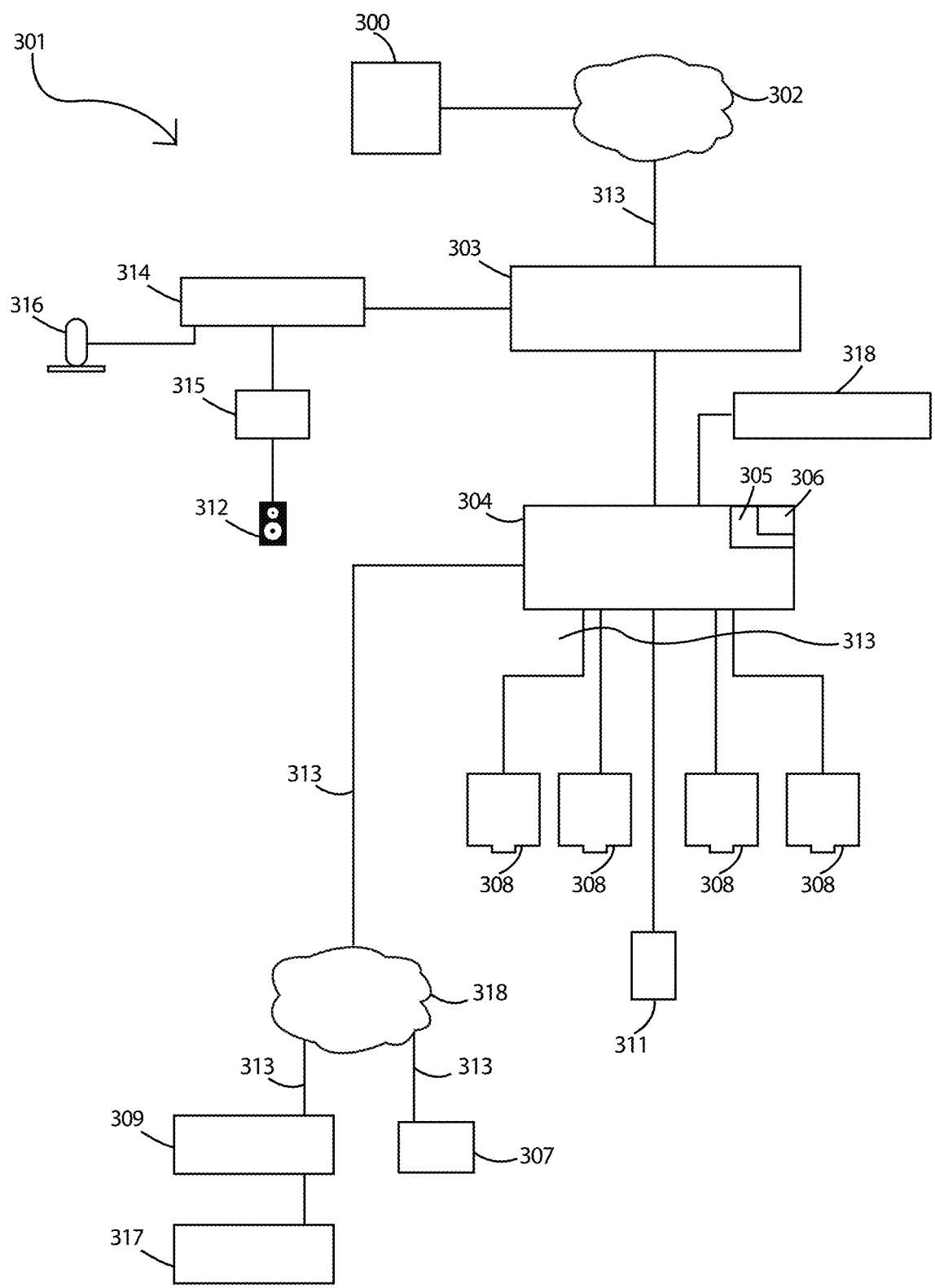
FIG. 3 is a block diagram of one embodiment of a video projection system architecture.

Referring to FIG. 3, a block diagram illustrates the architecture of a video system 301 as shown in FIG. 1, for example. System 301 includes one or more electronic gaming machines 300 which may be a slot machine, video poker machine, keno machine, automated bingo machine or the like that is connected through gaming network 302 to a gaming server 303. System 301 could also include a non-gaming electronic machine such as an ATM machine in place of an electronic gaming machine 301. Gaming server 303 may be a gaming signage server/player which may be connected to a video projection mapping server/processor 304. Server processor 304 takes the video output of the gaming signage server 303 and manipulates the video signal. This signal is then provided to multiple projectors 308 throughout the gaming venue to project the video signal other than of the game itself onto a surface visible in the gaming venue such as wall 103 of FIG. 1 or onto another projection surface as will be discussed below. The video projection with optional audio accompaniment is used to enhance the users overall experience. The video projection could also include a sporting event tape or live feed and the venue could be converted into a sports book type setting with various event projected and sports wagering on the electronic gaming machines.

In one embodiment, system 301 may include a master controller 309 which may include a process loop controller containing software to provide instructions to server processor 304 through a control network 310 and which may execute one or more applications or programs. Control device 309 may execute instructions and carry out operations associated with system 301 as are described herein. Processor 304 and control device 309 may include a memory 305. The memory 305 may include, but is not limited to, volatile storage such as random access memory, non-volatile storage such as read-only memory, flash memory, or any combination thereof. Memory 305 may contain computer-readable instructions, data structures, or program modules. System memory 305 may include a removable storage device and a non-removable storage device which are examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the system 301. The memory 305 may store an operating system 306 and one or more program modules suitable for running software applications. The operating system 306 may be configured to control system 301 and/or one or more software applications being executed by the operating system 306.

Using instructions from device memory 305, controller 309 may regulate the reception and manipulation of input and output data between components in system 301. Controller 309 may be implemented in a computer chip or chips. Various architectures can be used for controller 309 such as microprocessors, application specific integrated circuits (ASIC's) and so forth. Controller 309 together with an operating system may execute computer code and manipulate data. The operating system may be a well-known system such as iOS, Windows, Unix or a special purpose operating system or other systems as are known in the art. Control device 309 may include memory capability to store the operating system and data. Control device 309 may also include application software to implement various functions associated with the system 301. Control device 309 may be connected to server processor 304 though a control network 318 by connections 313.

Embodiments of the system 301 may also be practiced in an electrical circuit. The electrical circuit may comprise discrete electronic elements, packaged or integrated electronic chips containing logic gates, a circuit utilizing a microprocessor, or on a single chip containing electronic elements or microprocessors. For example, one or more embodiments of the present disclosure may be practiced using a system-on-a-chip (SOC) onto which one or more of the components illustrated in FIG. 3 are integrated. Such a device may include one or more processing units, graphics units, communications units, system virtualization units and various application functionalities all of which may be integrated onto the chip substrate. The functionality described herein may be operated via application-specific logic integrated with other components of the system 301 on the single integrated circuit.

As also shown in FIG. 3, the system 301 may include one or more input devices such as touchscreen 307. In some embodiments, the input devices may also include a keyboard, a mouse, a pen or stylus or a sound input device, in lieu of or in addition to a touch input device 307. The system 301 may also include one or more output devices such as projectors 308 and one or more displays 311. The output devices may also include one or more speakers 312 which are controlled through an audio digital signal processor 314 with the signals amplified by amplifier 315. System 301 may also include one or more printers or other output devices. The system 301 may also include one or more communication connections 313 that facilitate communications with various components of system 301. Such communication connections 313 may include a RF transmitter, a receiver, and/or transceiver circuitry, universal serial bus (USB) communications, parallel ports and/or serial ports.

System 301 may include an audio system including speakers 312, amplifiers 315 and digital signal processor 314 connected to gaming signage server 303. The audio system may also be used to provide and receive audible signals from a gaming establishment player. For example, a microphone 316 may be used to receive audible input and provide it to audio signal processor 314. In accordance with embodiments of the present disclosure, the microphone may also serve as an audio sensor to facilitate control of the audio visual system 301. The system 301 may further include a video interface 317 including a facial recognition camera to record still images, video, and the like as will be discussed below.

In one or more embodiments, data and information generated or captured by the system 301 may be stored locally. Additionally or alternatively, the data may be stored on any number of storage media that may be accessed by the system using a wired connection or a wireless connection between the system and a remote computing device. Additionally, data and information may be readily transferred between computing devices for storage and use according to various data and information transfer and storage mediums including electronic mail and collaborative data and information sharing systems. For example, the database of a gaming establishment may contain player gaming information which the gaming establishment has collected as part of its player loyalty or wagering account programs. Player gaming information could include player preferences or a player's gaming history or other demographic information associated with a player.

Figure 4:
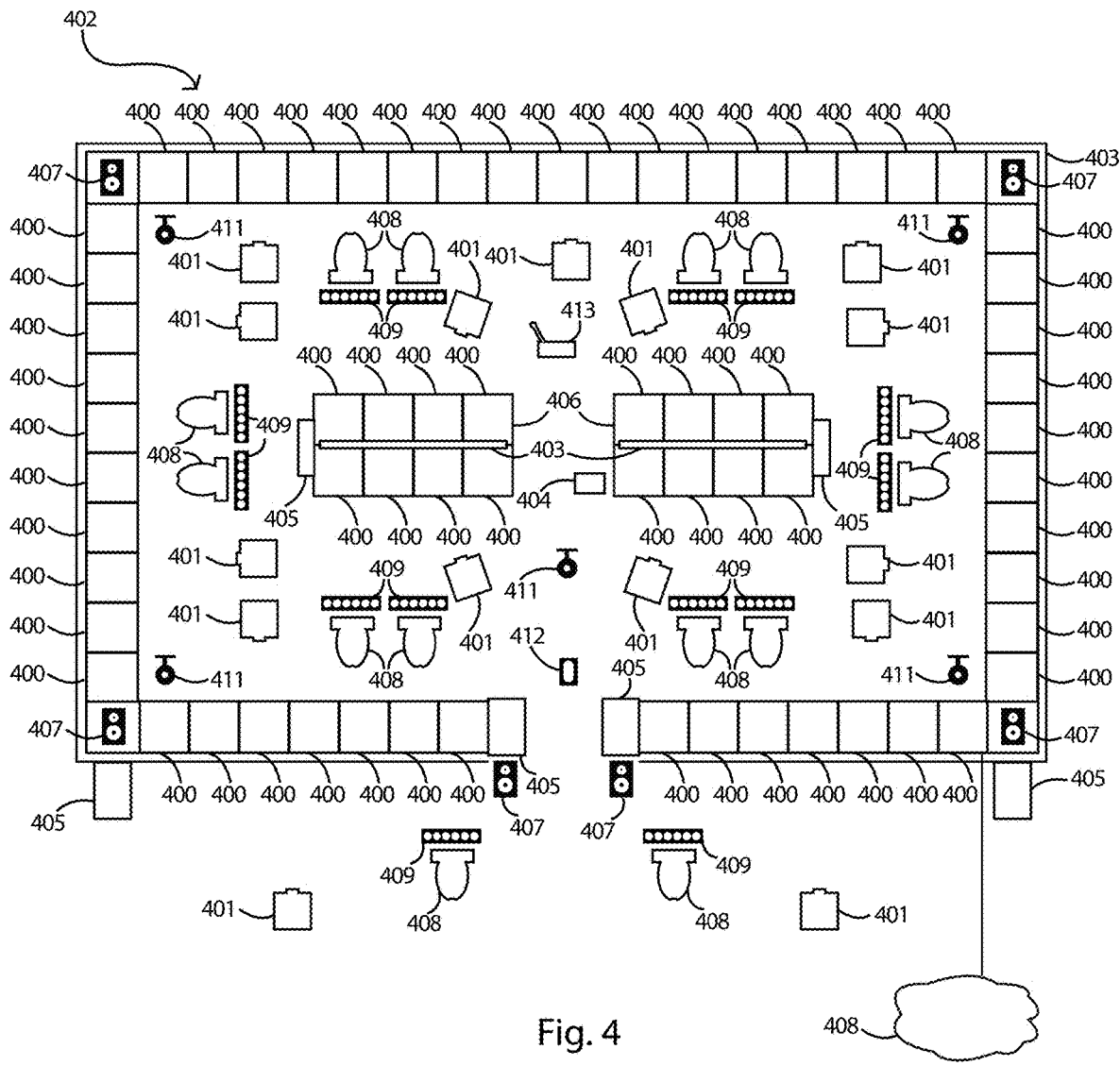
FIG. 4 shows a top view of a gaming venue with an alternate embodiment of a video projection system.

Referring to FIG. 4, a top view of an alternate embodiment of a floor layout for a casino slot machine gaming venue is shown. A plurality of electronic gaming machines 400 are distributed in a venue which may be a room 402 including walls 403. Room 402 may not be enclosed by four walls and may include only one, two, three or no walls. A plurality of video projectors 401 may be located in or on the ceiling or walls or floor above or below electronic gaming machines 400 or in another location on the casino premises and screened from view of the gaming customers. Video projectors 401 may project images onto walls 403 or other projection surfaces as will be described below. Electronic gaming machines 400 may be located around the periphery of gaming room 402 and/or in banks 406 distributed around the floor of room 402. One or more audio speakers 407 may be located in various locations around the room such as in the corners of the room. These speakers may be located on the floor, ceiling or mounted on the walls 403. In some embodiments, displays 405 which may include display screens or touchscreens like the way finding screens in some casinos are located adjacent banks 406 to provide a casino operator with the opportunity to advertise or otherwise provide information to prospective or current gaming customers.

Electronic gaming machines 400 may each be connected to a gaming network 408 operated by the gaming establishment. In some embodiments, a touchscreen 404 may be included in room 402. This touchscreen is connected to the gaming establishment control network and allows monitoring of the projectors 401 and other components of the system for maintenance or various other functions. For example, an employee of the gaming establishment could vary the gaming environment scenario depending upon the desires of the gaming establishment or the gaming customers in a location on the casino premises. For example, on certain holidays such New Year's Eve, a nostalgic or celebratory theme could be employed. While touchscreen 404 is shown in room 402 it should be understood that this control component may be hidden in an intermediate distribution frame (IDF) network closet or on racks with network equipment in a data center or otherwise screened from view of the gaming customers in a secured area. The status of the system may be monitored and controlled through this device. For example, alerts may be provided to inform a manager that one or more of video cameras 401 is or is about to become defective. These alerts may also be provided by text, email, pager or otherwise through a portable electronic device. In some embodiments, different gaming themes may be presented by the projectors and sound system either in a timed schedule or in a manually selected manner depending upon the preference of the gaming customers and/or the casino operator.

The embodiment shown in FIG. 4 also includes lights 408 and light emitting diode (LED) lights 409 which could also include LCD's, CRT's, plasma and OLED's. Lights 408 and LED 409 may be used in conjunction with projectors 401 or LED video panels to enhance the visual experience of a player. That is, light displays may be coordinated or added to video presentation from projectors 401. Lights 408 and LED 409 may also be used to highlight a winning event on a particular electronic gaming machine 400 by shining one or more lights in the form of spotlights onto the winning player and or gaming machine 400 played by that player. Additional sensory devices including lights 408/409, speakers 407 and displays 405 may be added to an entrance area 410 to further enhance a player's experience upon entry to the gaming room 402. Facial recognition cameras 411 may be added to entry area 410 to determine when a customer enters the room 402 and who that customer is as recognized by the gaming establishment database. Other facial recognition cameras may also be located at other positions in room 402. A radio frequency identification (RFID)/near field communication (NFC) controller 413 may also be included in room 402.

Controller 413 allows two-way communication between a portable electronic device such as a smartphone or other hand-held device carried by a player and the gaming establishment network. It may also enable Bluetooth communication on the player's portable electronic device and pair it with the casino network. This may allow files to be shared if the player is registered with the gaming establishment database including using contactless payment systems for the player to fund wagering activity. NFC controller 413 can be used in contactless payment systems, similar to those used in credit cards and electronic ticket smartcards, and allow mobile payment to replace or supplement these systems. In some embodiments, marketing information may be provided to a guest of the casino based upon the guest demographics provided by the casino database. For example, if a guest is known to the casino network to prefer steak, an image of a two for one deal at the casino steakhouse may be displayed to that guest.

Figure 5:
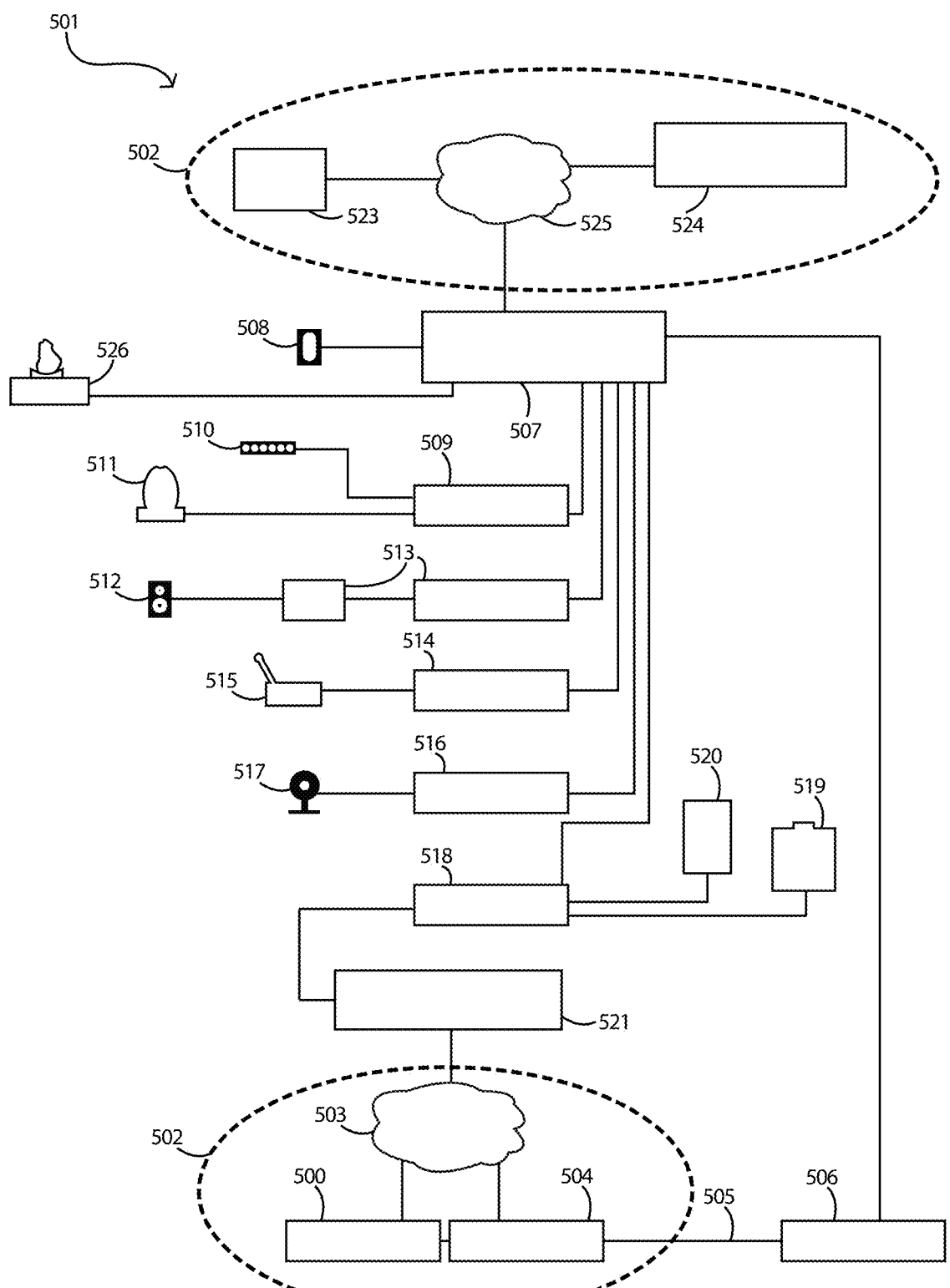
FIG. 5 is a schematic illustrating the architecture of one embodiment of a video projection system.

Referring to FIG. 5, a schematic of one embodiment of a system implementation 501 is shown. Electronic gaming devices 500 are connected through a gaming network, which in one embodiment is a gaming network 503 operated by the gaming establishment. Gaming establishment network 503 is part of the gaming establishment system 502 which also includes machines 500 and gaming device manufacturer logic systems 504. When a winning or other desired event occurs on one of gaming machines 500 a trigger signal 505 is generated by gaming machines and sent through the gaming network 503 to a process loop control translator 506 which in turn provides the trigger signal to a master processor 507. For example, in some embodiments, a jackpot winning on one of gaming machines 500 could trigger such a signal. The trigger signal 505 may be provided by the manufacturer of gaming machine itself as part of its control circuitry 504. This trigger signal is used by processor 507 to control various devices. The trigger signal could also be generated through the gaming network 503 to trigger video events as desired by the casino operator or as a result of detection of certain preferred players or other special events. Process translator 506 acts as a bridge between the gaming establishment system 502 and the master processor 507 and coordinates these systems. In another embodiment, master processor 507 may not be connected to a gaming establishment network and the video display may be one stored in master processor 507.

Referring again to FIG. 5, master processor 507 controls and monitors various devices associated with the audiovisual system including projectors 519 and the other components disclosed in the embodiment described in FIG. 5. In some embodiments, master controller 507 can be a programmable commercially available audiovisual server to control various video functions or it may be a custom server which employs various open source scripts which can be customized to provide video control. In one embodiment, master processor 507 receives input from a microphone 508. Thus, player voice or other audio signals may be received by the system. Master processor 507 is also connected to lighting controller 509 which also controls various lighting devices such as LED (which could also include LCD's, CRT's, plasma and OLED's) lighting 510 and theatrical lighting 511 which may distribute light rays to various desired locations. Master processor 507 also controls audio signals to speakers 512 through audio digital signal processor and amplifier 513 and smoke or haze generating apparatus 526. Master processor 507 is also connected to controller 514 which sends and receives signals from radio frequency identification (near field communication) device 515. Controller 514 is thus able to sense and provide information on gaming machine cards such as VIP type cards which may identify a player who is playing or adjacent one of gaming machines 500. Controller 514 may work in conjunction with facial recognition controller 516 connected to camera 517 to identify a player within sight of camera 516.

Referring again to FIG. 5, in addition to controlling and receiving input from the devices discussed above, master controller 507 is connected to video server processor 518 which controls the operation of video projector 519 and LED (LCD, CRT, plasma and OLED) display panel 520. Video processor 518 may also receive signals from gaming approved signage device 521 which is connected to gaming network 503. This allows the gaming establishment to provide additional video input to celebrate special events or other desired video displays.

Referring again to FIG. 5, in addition to gaming network 503 associated with gaming machines 500, gaming establishment system 502 also includes touchscreen 523, database 524 and information technology network 525. Network 525 may include control and audiovisual information technology. In operation, master controller 507 receives input from, and may provide information to, touchscreen 523, database 524 and information technology network 525. Input to and from touchscreen 523 may allow an employee of the gaming establishment to monitor the operation of the system and provide input thereto. For example, if one of video projectors 519 or LED displays 520 is defective, this information may be provided on touchscreen 523 to allow the defective device to be repaired or replaced. The information could also be communicated by email or text message to an employee on a portable electronic device such as a smartphone or by an alert provided to a pager. Master controller 507 stores information about each of projectors 519 such that, if one of projectors 519 is replaced, the replacement projector is programmed to function identically to the one it replaced without any additional control programming of the new projector. Touchscreen 523 may also allow gaming establishment employee to input a desired audio and or video event into system 501 to be displayed as discussed herein.

Database 524 may contain hospitality information about gaming players such as a favorite type of game to be played on gaming machine 500 or the player's birthday or similar information. The database 524 and Information Technology (IT) network 525 may provide information from a customer resource management or control management system utilized by the gaming establishment. In conjunction with controller 514, a player's loyalty card information or a VIP slot machine card or other information associated with a player or a player's gaming experience preference may be supplied to master controller 507 to enhance the player's gaming experience. In one embodiment, a player's video preference may be included so that an outdoor scene or an action figure for example may be displayed by the audiovisual display system. In another embodiment, a player's favorite type of music may be played through audio system 512. The music or other audio program selected may be based upon various parameters of the players in the gaming area. For example the audiovisual display may be determined by the system depending upon the majority of player types in the area. If more players prefer pop music than jazz then that type of music and associated video may be presented.

Figure 6A:
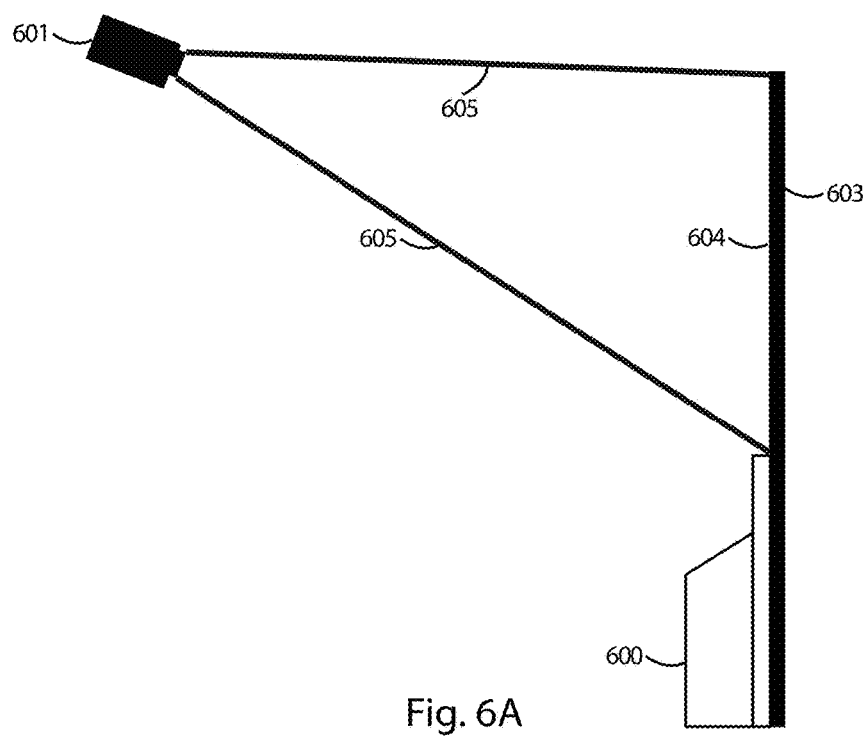
FIG. 6A is a side view of one embodiment of a video projection system.

Referring to FIG. 6A, a side view of the projection system for the embodiment of FIG. 1 is shown. Projectors 601 corresponding to projectors 101 of FIG. 1 in a room corresponding to room 102 project an image onto a surface which may be a wall 603 corresponding to wall 103 of FIG. 1. In other embodiments, an alternate surface 604 which may be a cloth, sheer screen, gatorboard, vinyl, or other opaque video screen may receive the image 605 from projectors 601. The electronic gaming machines 600 corresponding to gaming machines 100 in FIG. 1 provide input through the gaming network as described above to projectors 601 such that the image 605 projected onto surface 604 is coordinated and synchronized with the output of electronic gaming device 600 and a player may view the video graphics and presentation directly in front of him or her above electronic gaming machine 600.

Figure 6B:
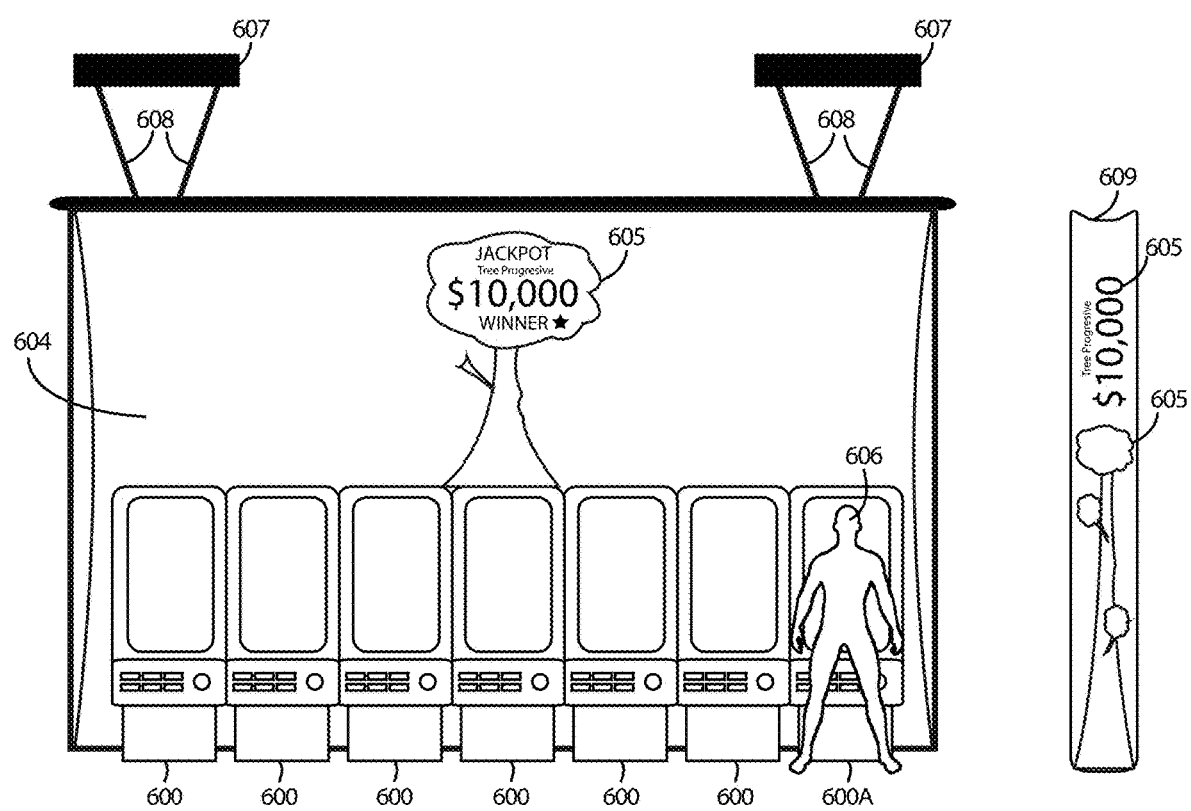
FIG. 6B is a front view of one embodiment of a video projection system.

Referring to FIG. 6B, a front view of the embodiment of FIG. 6A is shown. A player 606 stands in front of one 600A of gaming machines 600 with a view of surface 604. Image 605 which may display information regarding the progressive jackpot prize is projected onto surface 604 by one or more projectors 601. In this embodiment, the image from a particular gaming machine 600A is projected onto surface 604 such that, when player 606 wins, he or she is recognized. As discussed above, additional lighting and/or sounds may be associated with the video projection 605 and that lighting and sound may be used to recognize player 606 in the form of a spotlight or in the form of a player's image projected onto surface 604 directly adjacent to the electronic gaming machine 600A.

In the embodiment of FIG. 6, surface 604 is a white cloth or spandex type of white material which may be suspended from ceiling supports 607 by wires 608 or other suspension means which may include a motorized system to dynamically raise and lower surface 604 as desired. The raising or lowering of the surface 604 may be controlled by the system controller. In other embodiments, image 605 may be projected directly onto wall 603. The video system may also use pixel cloning, scaling, movement, layering, and masking along with edge blending multiple projectors to conceal features in gaming venue room 602 such as column 609 as will be described further below.

Figure 7A:
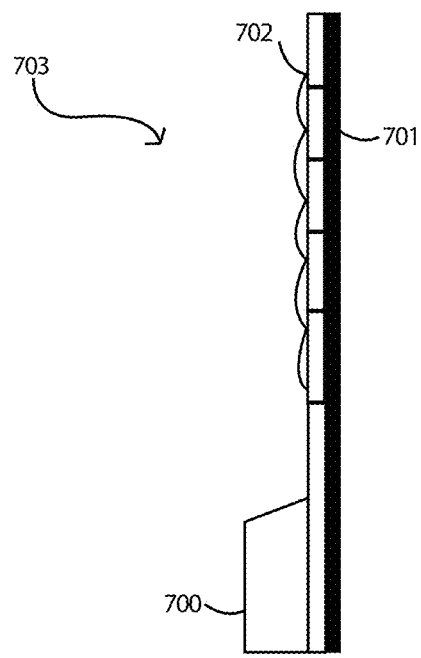
FIG. 7A is a side view of an alternate embodiment of a video projection system.

Instead of using a video projector, LED or other video panel walls such as OLED, plasma, CRT, and LCD can be used to display the video information. Referring to FIG. 7A, a side view of the projection system for the embodiment of FIG. 2 is shown. LED video panels 702 corresponding to LED video display device's 202 of FIG. 2 in a room 703 corresponding to room 203 of FIG. 2. Walls 701 include light emitting diode (LED) or liquid crystal (LCD) video display devices 702 thereon. Electronic gaming machines 700 may be located along walls 701 around the periphery of the gaming venue and/or in banks such as 206 in FIG. 2 distributed around the floor of the gaming venue 703.

Figure 7B:
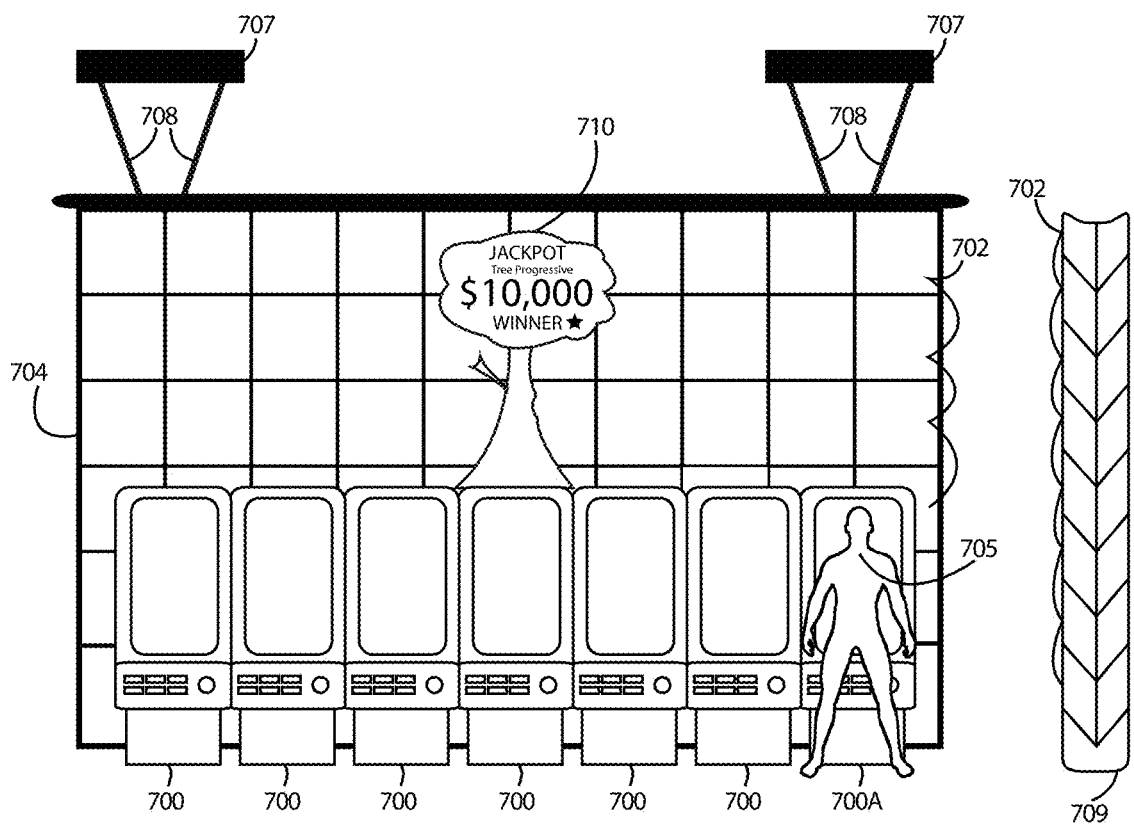
FIG. 7B is a front view of an alternate embodiment of a video projection system.

Referring to FIG. 7B, a front view of the embodiment of FIG. 7A is shown. A player 705 stands in front of one 700A of gaming machines 700 with a view of surface 704 which may include LED video panels 702. An image which may display information regarding the progressive jackpot prize is projected onto surface 704 through LED video panels 702. In this embodiment, the image from a particular gaming machine 700A is projected onto surface 704 such that, when player 705 wins, he or she is recognized by the system in the form of lights shining onto the player 705 of machine 700. A winning player's image may be projected onto surface 704 in some embodiments. As discussed above, additional lighting and/or sounds may be associated with the video projection on LED panels 702. In this embodiment, surface 704 may a white cloth or spandex type of white material which may be suspended from ceiling supports 707 by wires 708 or other suspension means. This support system can be mechanized such that surface 704 may be raised or lowered from the view of player 705. In other embodiments, LED video panels 702 may be located directly on wall 701. The video system may also use pixel cloning, scaling, movement, layering, and masking as will be described further below to conceal features in gaming venue room 703 such as to hide column 709 which may also contain LED video panels 702. The video system may also be used by the gaming establishment in conjunction with an emergency evacuation or warning system to direct players to an exit or otherwise to various locations in or out of the gaming establishment.

As discussed above the embodiments described herein use pixel cloning, scaling, movement, layering, and masking along with edge blending projectors to create the visual effects described herein by projecting information from the electronic gaming machine display to the projectors of LED video panels for display on the casino walls. Pixel projection mapping may be used to make a feature or an object look like something else. For example, column 609 in FIG. 6B may be masked by projecting images on it to blend with background of casino room 602 in order to eliminate it from the view of player 606. The video projection 605 could use column 609 part of a projection surface or column 609 could be masked or layered by the video projection system to make it blend into the background and obscure it from view.

As discussed above, the visual system described herein may use image manipulation and editing to enhance the player experience and contribute to creating the desired player atmosphere. Video programming techniques such as pixel cloning, pixel scaling, pixel movement, and pixel masking may be employed to enhance images associated with the system. Image or pixel scaling includes changing the size of one or more elements in an image. The digital image is resized, either larger or smaller. Individual pixels may become visible or jagged and techniques such as pixel averaging may be used to overcome this issue and even out the appearance of the original pixels. Pixel scaling algorithms may be used to upscale or downscale an image to appear smooth and sharp.

In another embodiment, image editing includes altering the images to enhance them. Vector graphic editors, raster graphic editors and three dimensional modelers may be used to enhance images to retouch, or modify images. Pixels can be changed as a group or individually to alter images. The image can be resized as in scaling as discussed above and images can be cropped to emphasize certain portions of the image. In cropping, an unwanted portion of an image may be discarded while the desired portion of the image may be retained and displayed in a high resolution format. For example, in some embodiments, a player's face may be projected onto a surface while the image of the remainder of his or her torso may be discarded. A digitally stored image may also be enhanced by software to make the image lighter or darker or to increase the contrast. Different forms and processes for image editing exist to sharpen, soften slice and combine images and to generate three dimensional images by merging or layering images. Image layering may use one layer as a background layer and to add image layers or portions of image layers. The image editing may also result in system efficiencies. For example, pixel cloning including multilayer images may allow for smaller file sizes rendered in real time rather than one complete image.

As discussed above with respect to FIG. 6, pixel or image masking may be used in the video system with pixel cloning, scaling, movement, layering, along with edge blending multiple projectors to conceal features in gaming venue room 602 such as column 609. Pixel mapping may also be used in some embodiments of the video system described herein. Pixel mapping is a technique which uses fixed pixels on a device such as an LED or LCD or OLED or plasma or CRT monitor to display an input image without scaling it and to avoid a loss of image quality which may otherwise occur by scaling artifacts in the image. Pixel mapping may also be used to create three dimensional effects such as holograms and images which may appear to be moving such as birds that may appear to fly across a gaming venue or other moving images. The use of image enhancement techniques such as pixel cloning, pixel scaling, pixel movement, and pixel masking will be illustrated further in the embodiments described below.

Figure 8:
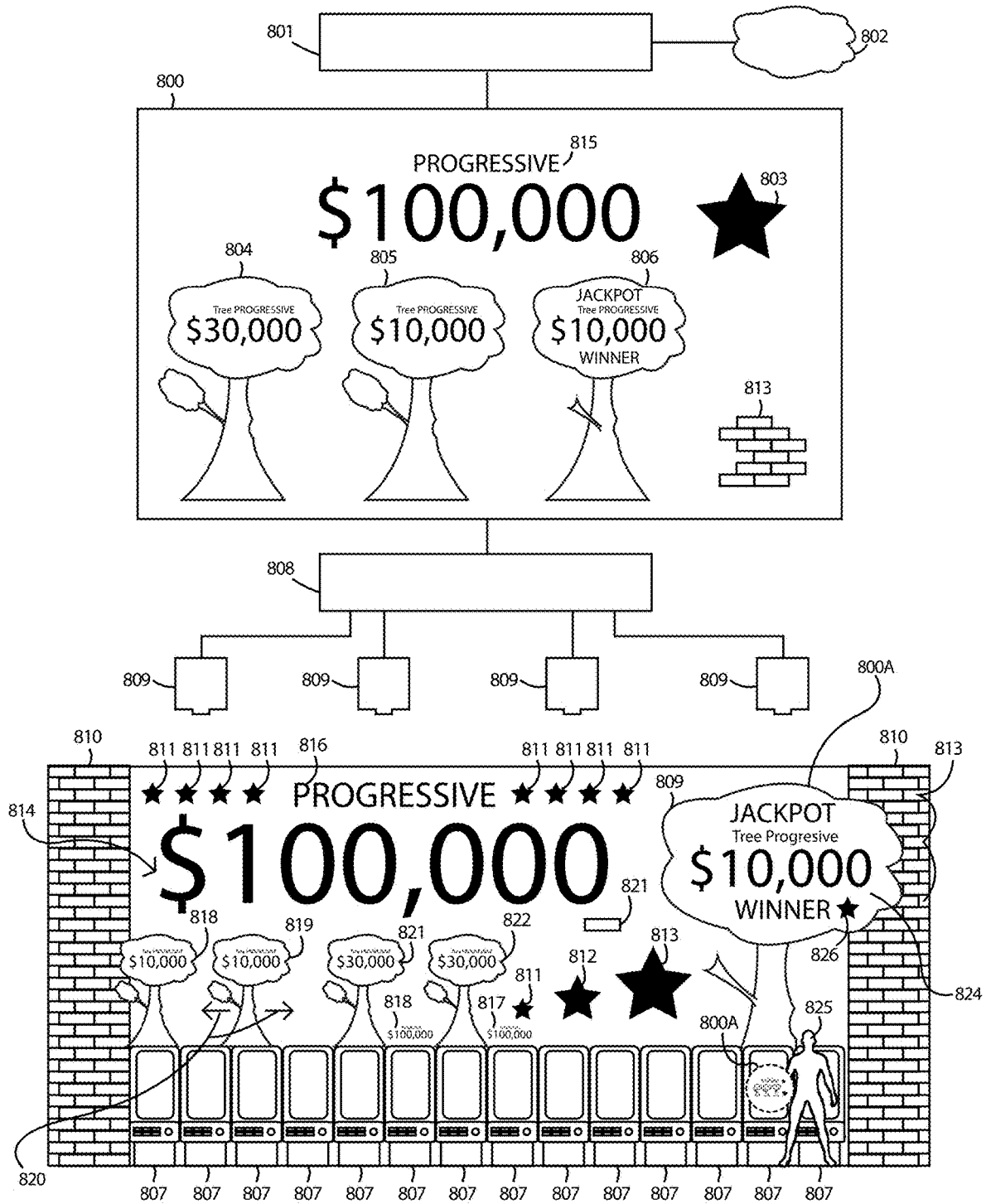
FIG. 8 is a front view of an image projected in a gaming environment.

Referring to FIG. 8, one embodiment of a video system employing the video enhancement techniques described above is shown. An image 800, which includes information supplied by gaming network 802 through gaming signage server 801 is shown. Image 800 includes icons such as a star 803, trees 804, 805, 806 each of which also includes information about the type and size of the potential winning amount which may be claimed by the player upon winning the game. Image 800 is the same as image 800A which is shown on the face of one or more of the gaming machines 807 in the gaming venue. Image 800 may be transmitted and stored as described above through video projection mapping server 808 where video enhancing techniques such as pixel or image masking, pixel cloning, scaling, movement, and layering of image 800 may be accomplished.

Referring again to FIG. 8, image 800 may be transmitted to projectors 809 in the gaming venue to be displayed on wall 810. As described above, in some embodiments another projection surface may be used to cover wall 810 while, in other embodiments, LED (LCD, CRT, plasma and OLED) video panels may be used on wall 810 to present image 800A. Image 800A on wall 810 differs from image 800 that is displayed on electronic gaming machine 807. Certain portions of the image 800 have been resized, emphasized, and duplicated (cloned) while other video enhancement techniques such as video mapping have been used to alter image 800 and the background of wall 810. In some embodiments, image 800A could be a live video feed or a video taken from gaming establishment signage. For example, in some embodiments, image 800A could be a sporting or other event and wagering could occur on gaming machine 807 to simulate a sports book type of gaming venue.

Referring to FIG. 8, image 800A as displayed or shown on wall 810 includes images from image 800 on gaming machine 807 that have been enhanced and modified. Pixel modification has been used by server 808 to take star icon 803 from image 800 and both clone it into multiple stars 811 in image 800A and scale it into different size stars 811 and 812. In addition star 803 has been reproduced in image 800A. In addition to star 803, the icon 815 representing the progressive payout ($100,000) for electronic gaming machines 807 is both enlarged 816 and reduced 817 in image 800A by pixel scaling and presented in modified locations on the graphic 800A by pixel cloning.

In the embodiment shown in FIG. 8, wall 810 may be made to look like it is made from bricks 813 taken from image 800. That is, in projected image 800A on wall 810, bricks 813 may be cloned from image 800 and made visible as columns in projected image 800A on either side of white background 814. Tree icons 804, 805 and 806 in image 800 have also been cloned and scaled in image 800A. Icon 805 has been reduced and relocated as icon 818 in image 800A. Icon 805 has also been cloned as icon 819 and made to move left and right in image 800A as indicated by arrows 820. The addition of movement in the image 800A also adds to player's visual experience. Movement in the form of three dimensional (3D) graphics could also be added to make icon 819 appear as a hologram. Icon 804 representing a single tree in image 800 has been cloned into two icons 821 and 822 in image 800A. Icon 806 in image 800 has been cloned and scaled into large icon 824 and reproduced directly in front of player 825 to indicate that player 825 has won the progressive jackpot of $10,000. A star icon 826 which was cloned and scaled from icon 803 in image 800 has also been added to tree icon 824. In addition to image 800A to highlight a winning player, in some embodiments, lights and sounds may be directed at player 825 to further highlight his or her winning event as discussed above with respect to FIGS. 1 and 2.

Various video manipulation techniques may be used to reproduce the images described herein. For example, key stoning may be used to center a projector which is not in the middle of a screen. The image may be warped to fit the screen and may be accomplished by mechanically moving the projector or through the video master processor such as 507 in FIG. 5 or 808 in FIG. 8. In addition, video layering may be used to project one image on top of another. For example, referring to FIG. 8, tree images 804, 805, 806 may be layered onto brick background 813. Similarly, stars 811 may be layered onto the image. This can be accomplished in master video processor 808. Another technique which may be advantageously employed in some embodiments is projection or image blending. In this technique, images from multiple projectors 809 are overlapped onto a screen to provide a uniform image and eliminate the video image edge effects such as overlap and distortion associated with images from multiple projectors.

Figure 9:
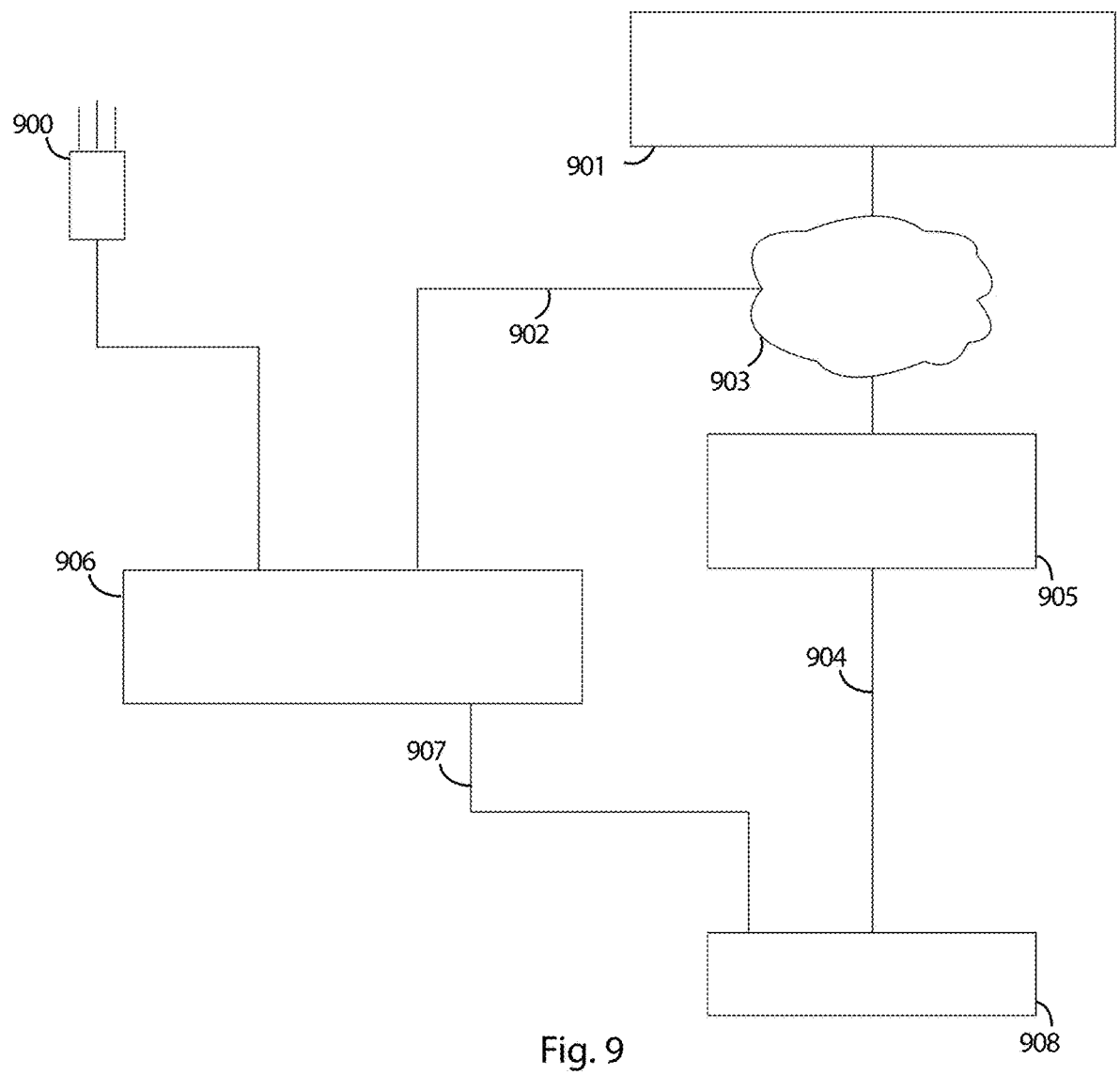
FIG. 9 is a schematic of a projection control and management system.

Referring to FIG. 9, a schematic illustrates the projection control and management system. An audiovisual device 908 which may be a video projector, DVD player or similar device is connected via a connection 904, which may include a Category 5 or 6 cable, an optical fiber cable, a coaxial cable, or a wireless connection (all hereinafter referred to as "two way connection"). Connection cable 904 may connect by Universal Serial Bus (USB), RS 232 serial port or other connection to a device monitor controller 905. Controller 905 monitors the diagnostics for device 908 including storing data and monitoring various outputs of device 908 such as brightness, aspect ratio, color and the like. In some embodiments, device controller 905 may be connected through control network 903 (similar to control network 525 in FIG. 5) to a process loop control master processor controller 901. In some embodiments, controller 901 may be combined with controller 905. Controller 905 is also connected to power controller 906 by two way connection 902 through network 903. Power controller takes power from a power supply 900 and acts like a smart power surge protector to monitor current to device 908 through supply cable 907.

Figure 10:
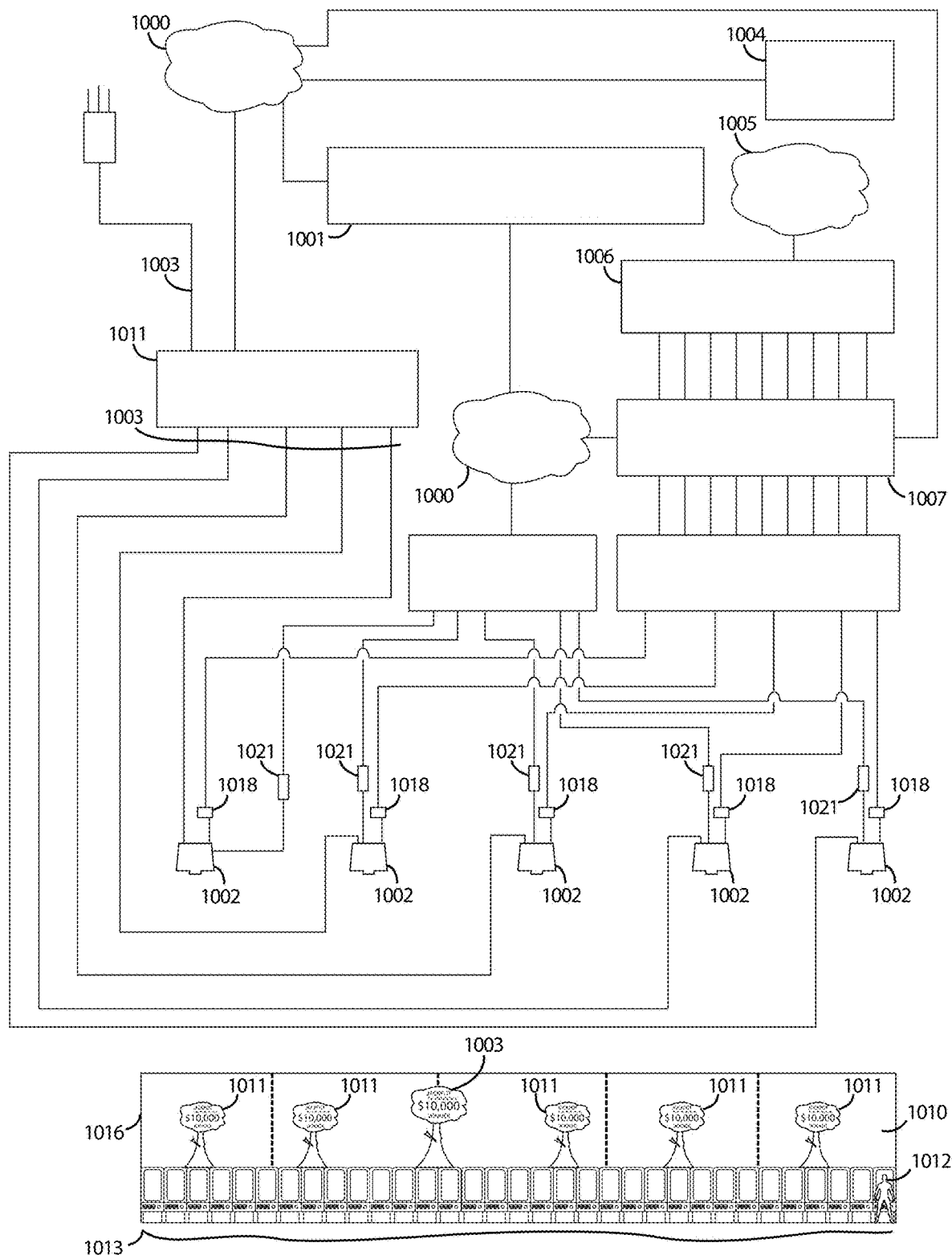
FIG. 10 is a schematic of a projection control and management system including a gaming network.

Referring to FIG. 10, in one embodiment, the video control and projection system is shown with information technology network 1000 similar to network 525 described in FIG. 5 through which a touch screen 1004 similar to touchscreen 504 and master controller 1006 similar to controller 507 are connected by two way connections. Power monitor 1011 similar to monitor 906 in FIG. 9 provides and monitors power 1003 to video projectors 1002. Gaming network 1005 and gaming signage server 1006 are connected by two way connections to video projection processor server 1007 which is connected through control network 1000 by two way connections to master processor controller 1006. A device monitoring controller 1008 and video distribution controller 1009 are connected to video projectors 1002. Controller 1008 is connected to controller 1006 and server 1007 through network 1000. In some embodiments, controller 1008 is combined with controller 1009 to distribute and control the video feed to projectors 1002. In another embodiment, controller 1009 could be eliminated and video projection processor server 1007 is connected directly to devices 1002. The video control and projection system includes a projection surface 1010 onto which projectors 1002 may display an image 1011 which may be viewed by player 1012 who is playing electronic gaming machines 1013.

Figure 11A:
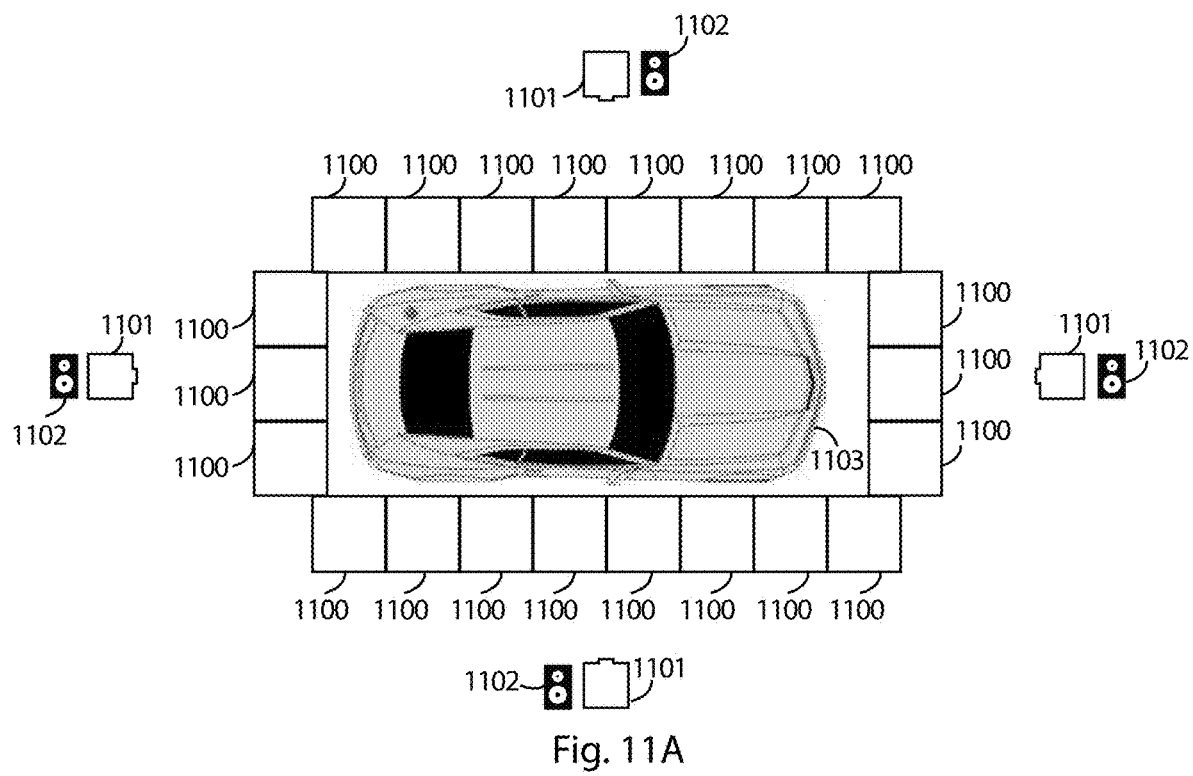
FIG. 11A is a top view of one projection environment.
Figure 11B:
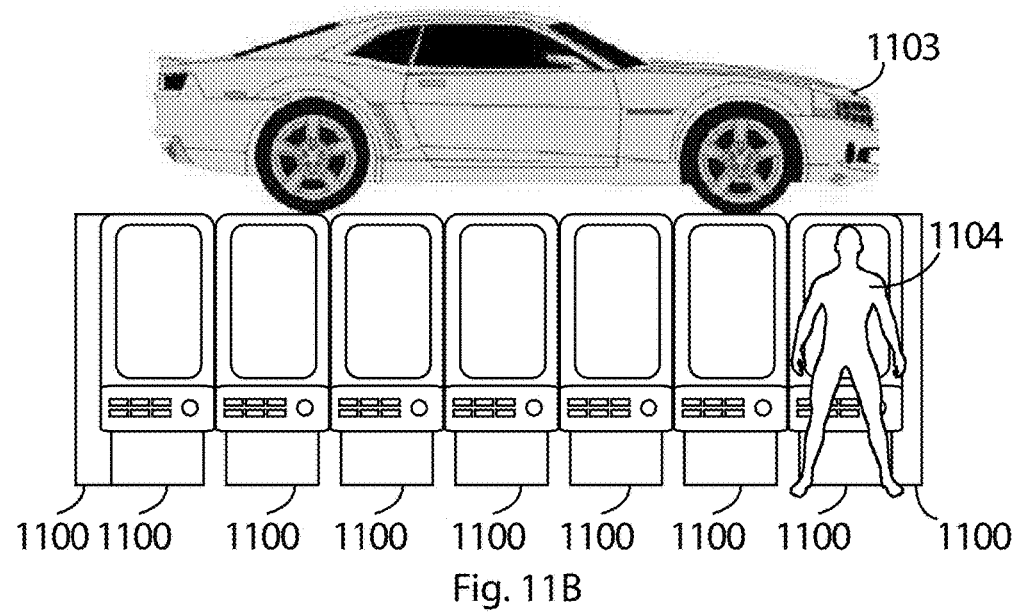
FIG. 11B is a front view of one projection environment.

Referring to FIG. 11A, the video control and projection system described herein may be used to generate sounds and project images on other objects. In one embodiment shown in a view from above, video projectors 1101 may project an image onto an automobile 1103 which may be surrounded by gaming machines 1100. In this embodiment, sounds may also be generated from speakers 1102 such that a player, not shown, may see car 1103 change colors and/or appear to be driving through a particular scenic background. In another embodiment, car or object 1103 could be wrapped in LED (including OLED, LCD, CRT and plasma) video panels and an image projected as described herein. In another embodiment, advertising could be projected onto car 1103. In another embodiment, an auto racing event may be simulated with images projected onto automobile 1103 while racing engine sounds are broadcast from speakers 1102. Referring to FIG. 11B, a side view of the embodiment of FIG. 11A is shown with a player 1104 viewing automobile 1103 from the side while playing electronic gaming machines 1100. While an automobile 1103 is shown in this embodiment, in other embodiments other articles may be shown. For example a treasure chest may have images of money or gold coins or jewelry projected thereon.

Figure 12A:
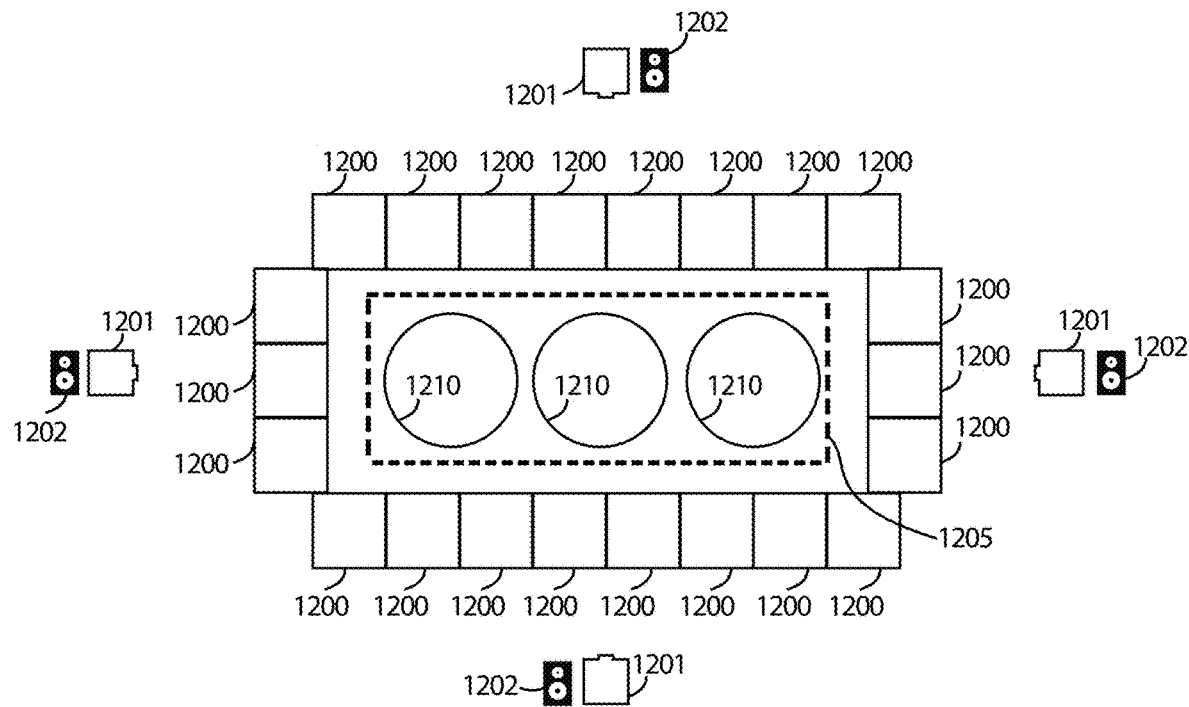
FIG. 12A is a top view of an alternate projection environment.
Figure 12B:
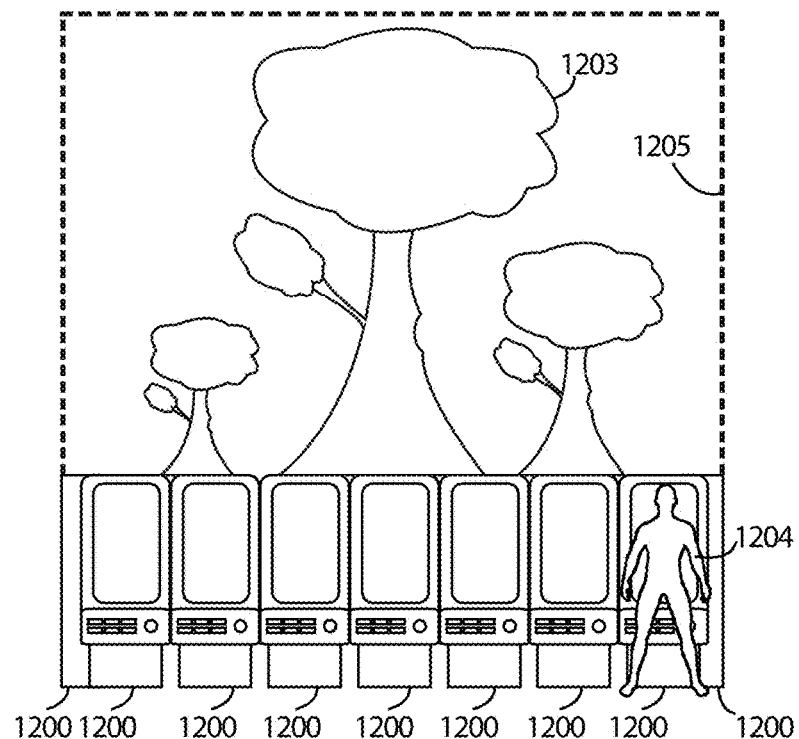
FIG. 12B is a front view of an alternate projection environment.

Referring to FIG. 12 A, in another embodiment, a top view of video projectors 1201 in a control and projection system as described herein may be used to project an image onto a background surface 1205 which may be a curtain or a stack of boxes or a two or three dimensional action figure surrounded by electronic gaming machines 1200. Image 1203 could also be projected onto the surface 1205 supported on moving carousels 1210. Audio speakers 1202 may be used to simulate nature or other sounds associated with the image. Referring to FIG. 12B, a side view of embodiment 12A is shown. Image 1203 may be viewed by a player 1204 who is playing and wagering on electronic gaming machines 1200. While image 1203 is shown as a tree in one embodiment, the image could be an image of an action figure or any other image.

Figure 12C:
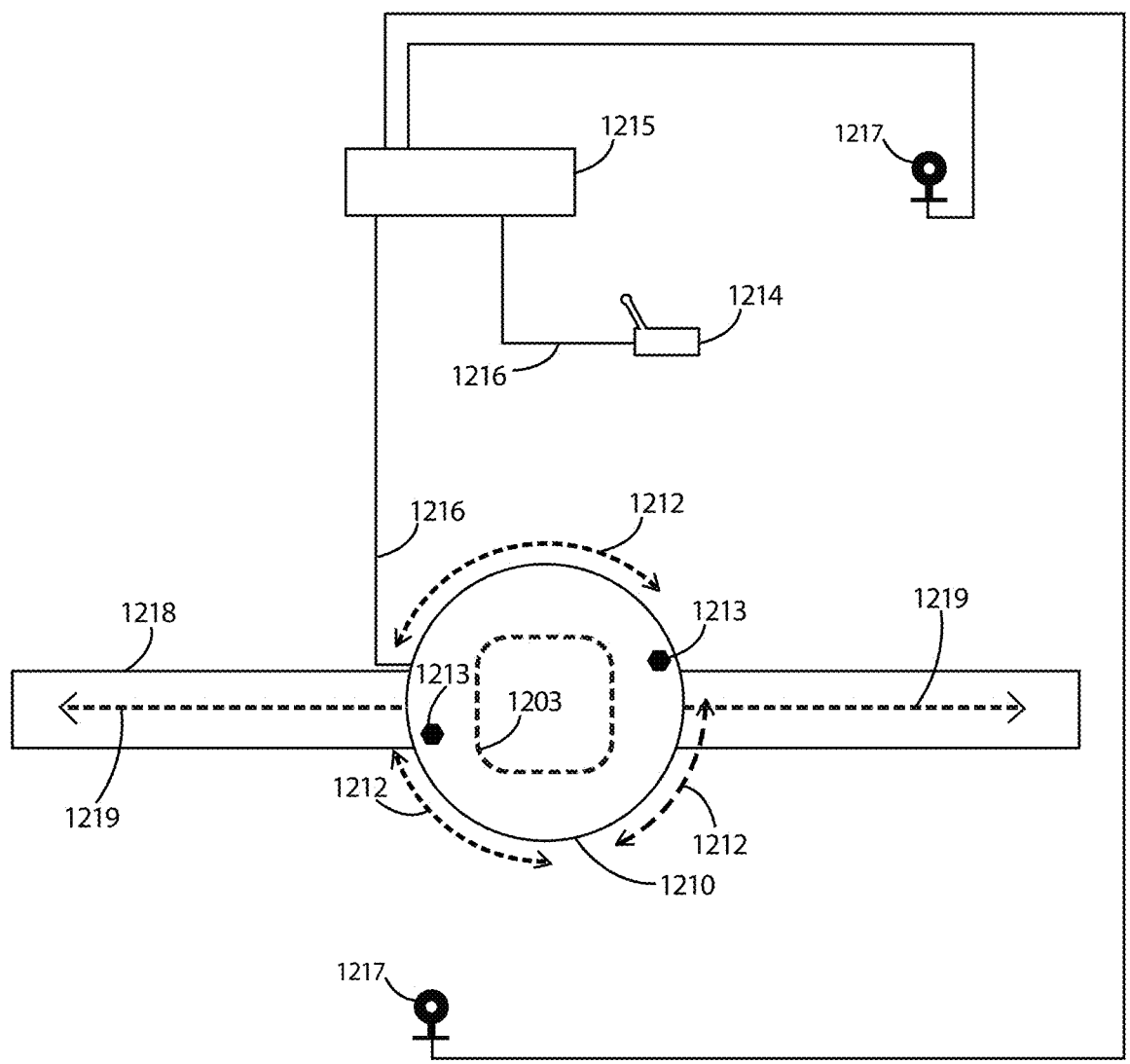
FIG. 12C is a schematic of the projection system of FIG. 12A.

Referring to FIG. 12C, a schematic of the embodiment shown in FIG. 12A includes one or more cameras 1217 which may provide location information for image 1203 on moving carousel 1210. Cameras 1217 may work in conjunction with RFID or other location based device 1214 and sensors 1213 which may be infra-red nodes in one embodiment to provide carousel location information to controller 1215 such that image 1203 may continue to be projected onto the moving carousel 1210. Master processor 1215 sends and receives signals from radio frequency identification (near field communication) device 1214 and is connected by hardwire or other connector 1216 to turntables 1210 and may control their movement in a circular direction 1212 or in a linear direction 1219 along a mechanical track 1218. Thus turntable 1210 may both rotate and translate to provide movement during projection of a video image thereon by cameras 1201. In one embodiment, a three dimensional representation of an action figure may be used as background surface 1205 placed on carousel 1210 and image 1203 may be projected onto the action figure. The action figure could move along a bank of machines in a translational direction 1219 while rotating 1212. In one embodiment, the moving carousel 1210 could stop in front of a winning player 1206 and the projected image could make the surface 1205 appear to move or gesture or point to a winning player 1206 on an adjacent gaming machine 1200 in a bank of gaming machines.

Figure 13A:
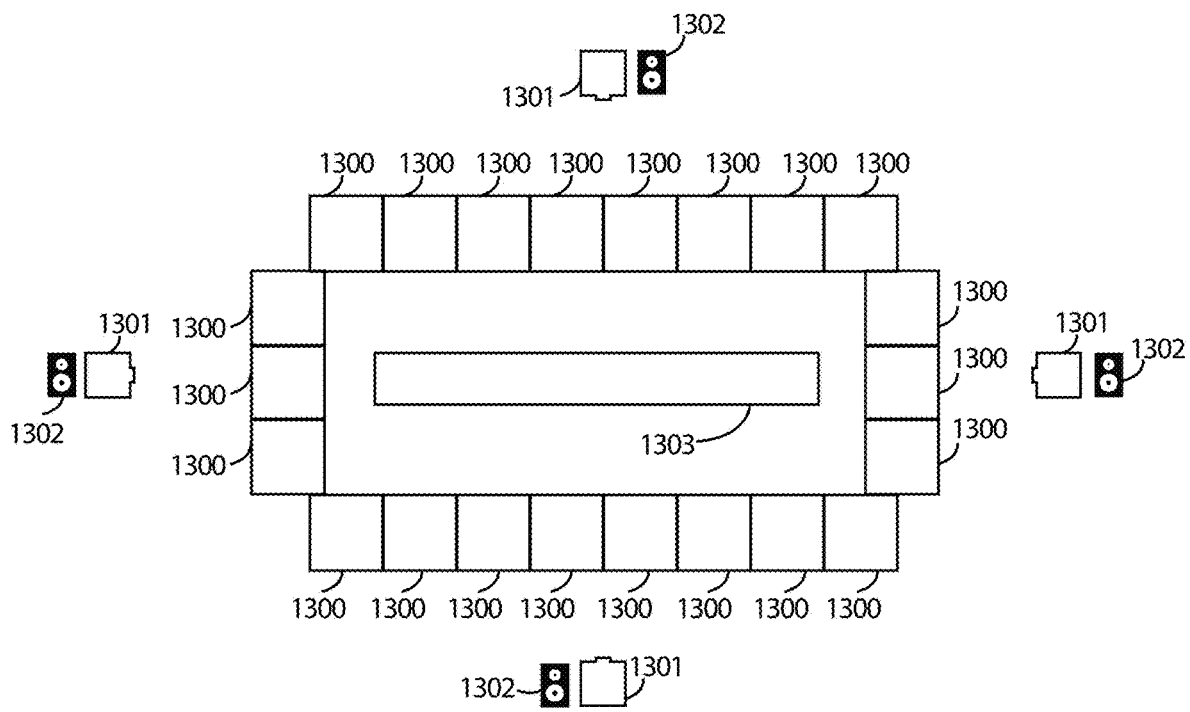
FIG. 13A is a top view of an alternate projection environment.
Figure 13B:
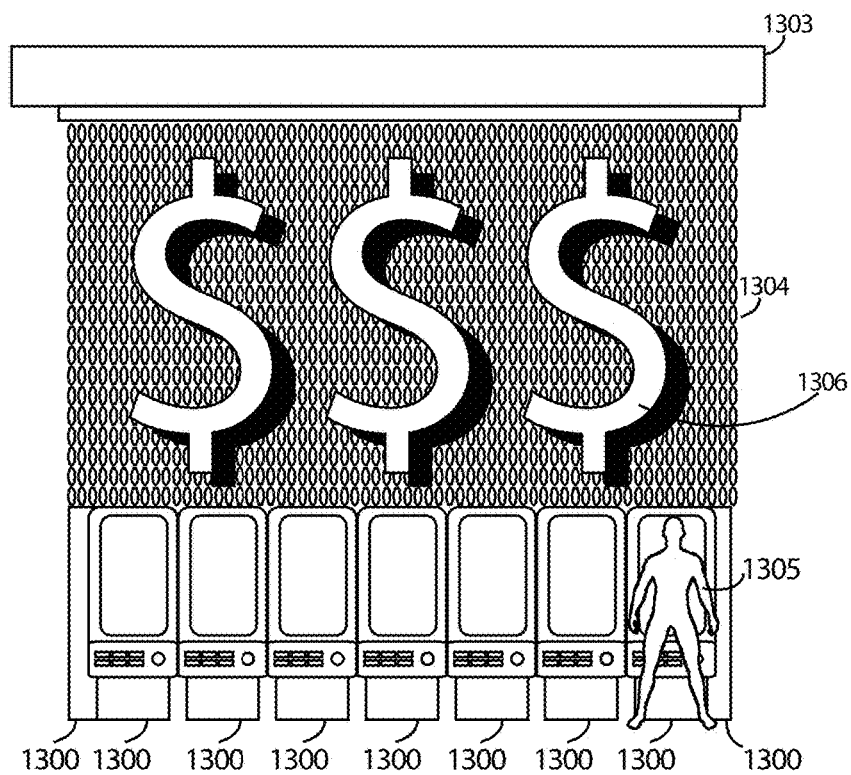
FIG. 13B is a front view of an alternate projection environment.

Referring to FIG. 13A, in a top view of another embodiment of the video control and projection system described herein, electronic gaming machines 1300 surround a water vapor misting device 1303. Projectors 1301 and speakers 1302 may be employed and controlled by the system to project an image 1306 shown in a side view in FIG. 13B. Player 1305 may view image 1306 while playing electronic gaming machines 1300. Image 1306 is projected onto water droplets 1304 generated by misting device 1303. In another embodiment, misting device could be replaced by smoke and haze machine 526 and image 1306 could be projected onto the smoke or haze.

Figure 14A:
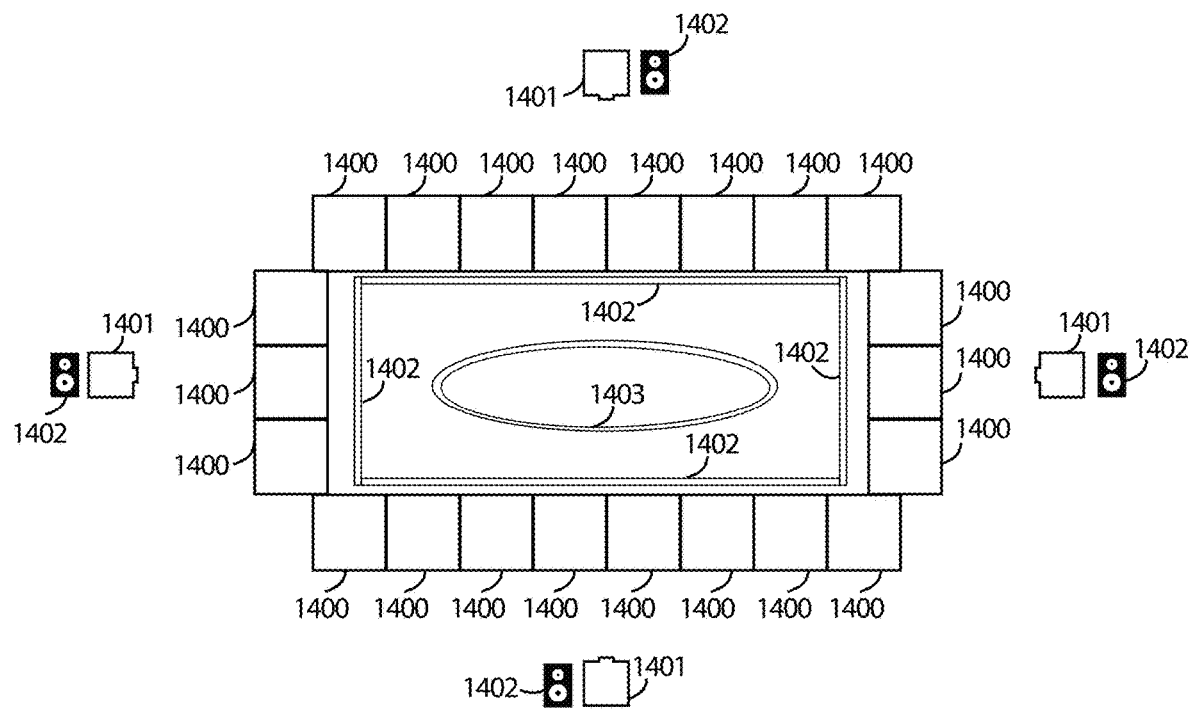
FIG. 14A is a top view of an alternate projection environment.
Figure 14B:
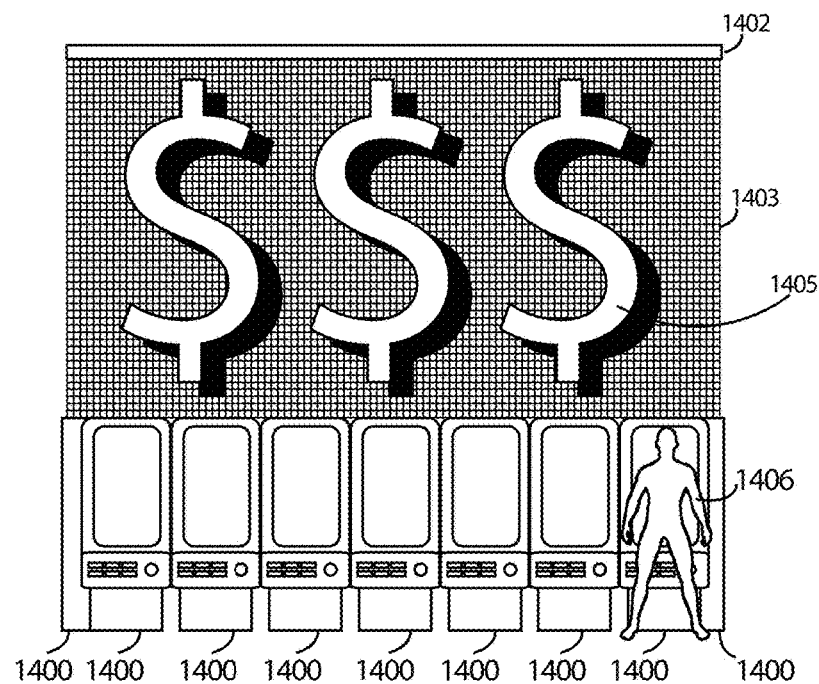
FIG. 14B is a front view of an alternate projection environment.

Referring to FIG. 14A, in another embodiment, a top view of electronic gaming machines 1400 are shown in a bank surrounding a support structure 1402 which may be an optically transparent box like structure from which a semi-transparent material 1403 such as a sheer mesh material may be suspended. Video projectors 1403 and sound system 1404 provide audiovisual performances. For example, video could be displayed on material 1403 to create a visual effect which simulates a hologram. Referring to FIG. 14B, a side view of the embodiment shown in FIG. 14A is shown with mesh material 1403 suspended from support structure 1402. An image 1405 of dollar signs ($$$) is shown on material 1403. Because material 1403 is semi-transparent, the effect of image 1405 may be holographic-like in visual perspective to a player 1406 in front of one of gaming machines 1400.

Figure 15A:
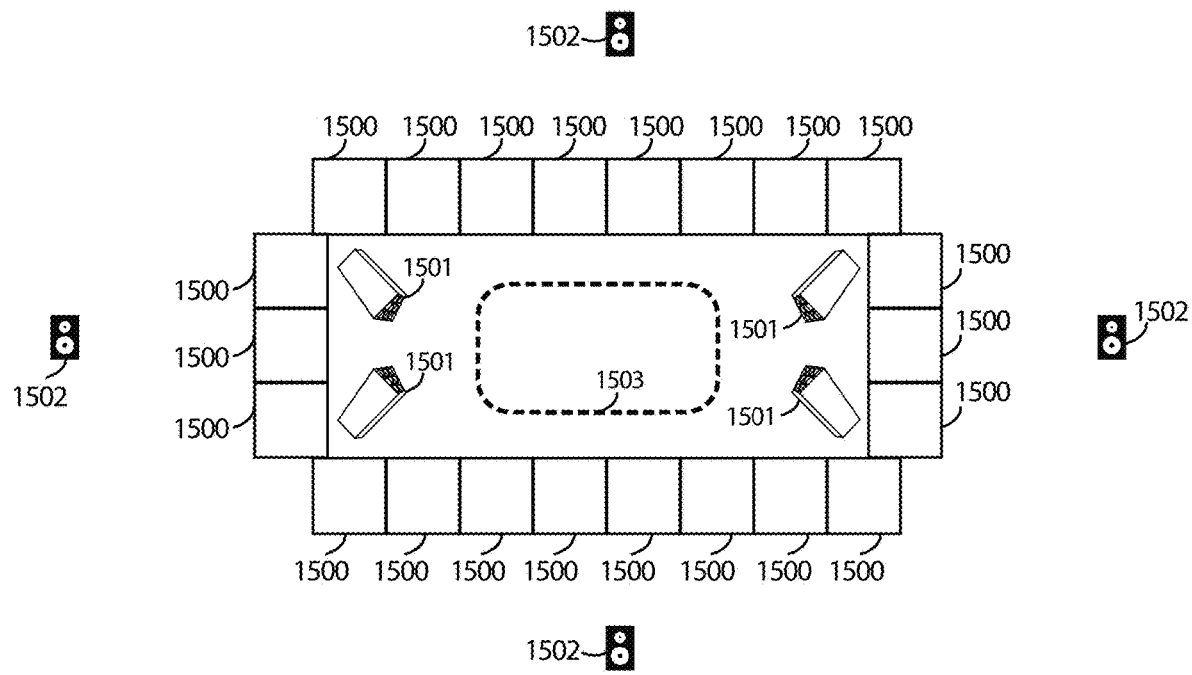
FIG. 15A is a top view of an holographic projection environment.
Figure 15B:
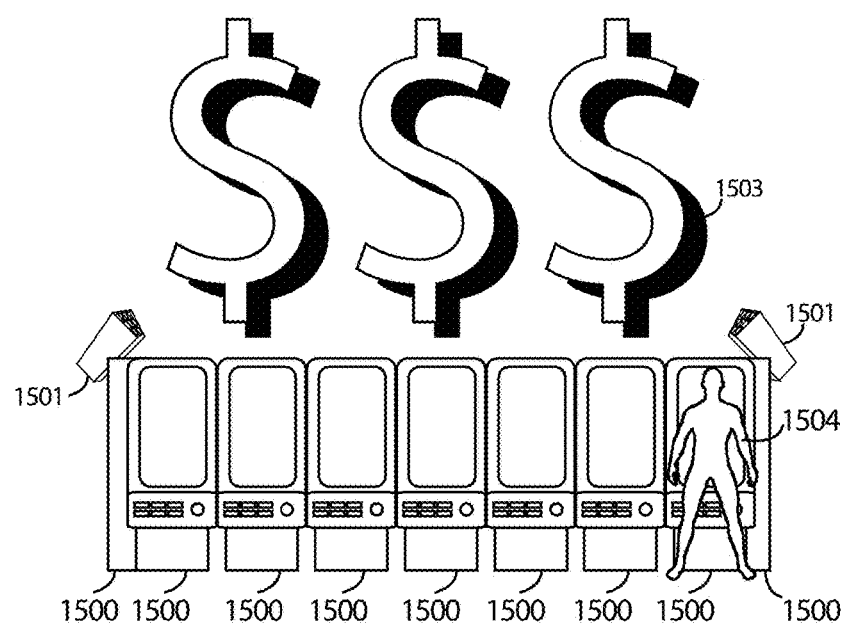
FIG. 15B is a front view of a holographic projection environment.

Referring to FIG. 15A, a top view of an alternate embodiment of the video control an projection system is shown with holographic projectors 1501 positioned adjacent to a bank electronic gaming machines 1500. Audio system 1502 is also included in this embodiment. Holographic images may be generated from projectors 1501. Holograms are three-dimensional images encoding light fields rather than of images formed by a lens. The holographic display itself is not an image. It consists of a random structure of varying light intensity, density or surface profile. Referring to FIG. 15B, a side view of the embodiment shown in FIG. 15A includes a holographic image 1503 in the form of dollar signs ($$$) generated by holographic projectors 1501. Image 1503 appears to be suspended in mid-air above gaming machines 1500 as viewed by player 1504.

Figure 16A:
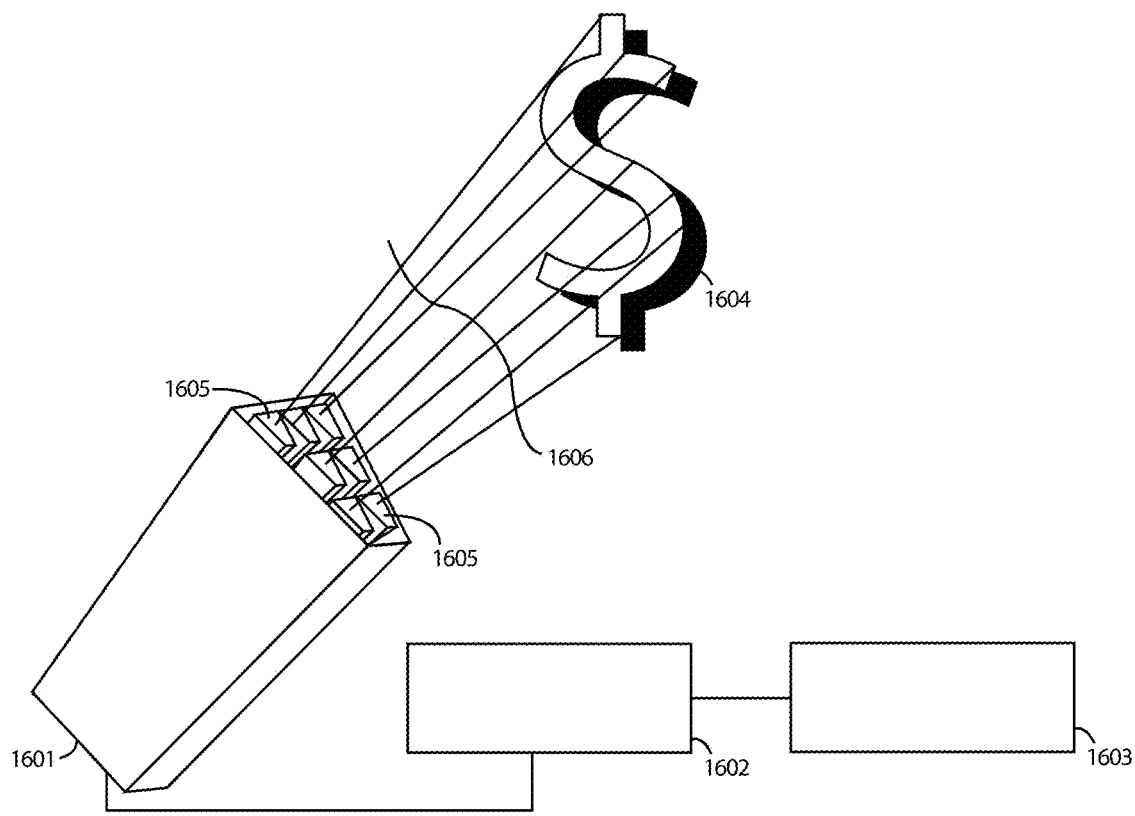
FIG. 16A is a schematic of a holographic projection system.
Figure 16B:
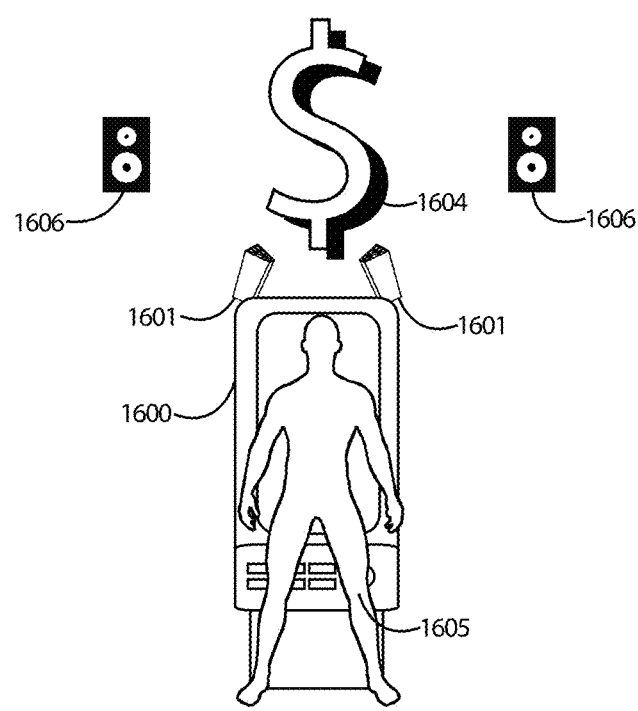
FIG. 16B is a front view of an alternate holographic projection system.

Referring to FIG. 16A, in another embodiment of the video control an projection system, a holographic projector 1601 is connected to a holographic laser light processor/server 1602 and a video projection mapping processor/server 1603 to generate a holographic image 1604 of a dollar sign ($). Referring to FIG. 16B the holographic projector of FIG. 16A is shown as employed with an electronic gaming machine 1600. Holographic image 1604 is generated by holographic projectors as described in FIG. 16A such that a player 1605 may view the holographic image 1604 above the gaming machine 1600. As with the other embodiments, audio system 1606 may be employed with the video display.

Figure 17:
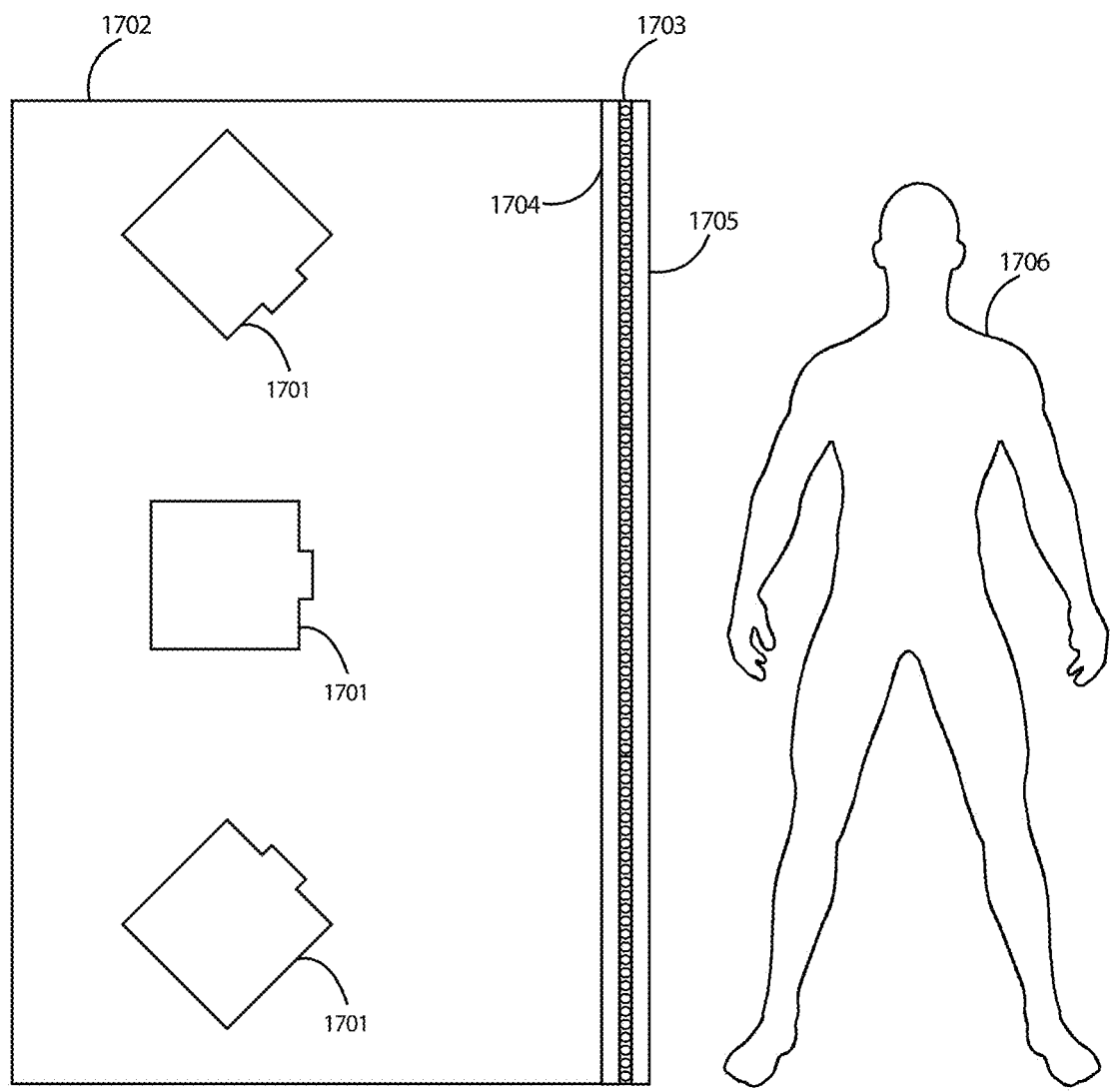
FIG. 17 is a side view of an alternate internal projection system.

Referring to FIG. 17, in another embodiment the video control and projection system could be used to project images internally. In one embodiment, video projector 1701 may be enclosed by an optically transparent enclosure 1702 such that a player 1706 may view a video screen 1703 enclosed within enclosure 1702. Video screen may include a rear projection screen in some embodiments while in other embodiments screen 1703 may be an LED screen and projector 1701 may be eliminated. Optically transparent surfaces 1704 and 1705 such as acrylic or other suitable films may optionally be included on either side of screen 1703 to protect it. In this embodiment, a conventional electronic gaming device may also be contained within enclosure 1702 as will be discussed below.

Figure 18:
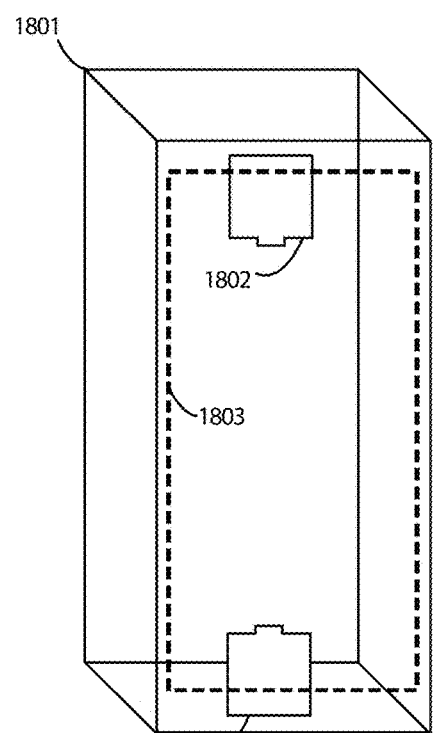
FIG. 18 is a perspective view of an alternate embodiment of an internal projection system enclosing an electronic gaming machine.

Referring to FIG. 18, in another embodiment the video control and projection system projects images internally similar to FIG. 17. In FIG. 18, optically transparent enclosure 1801 includes one or more projectors 1802 which in one embodiment, may include one each at the top and bottom of enclosure 1801. A conventional electronic gaming device 1803 shown in phantom is enclosed by enclosure 1801. Projectors 1802 may display an image of gaming device 1803 onto enclosure 1801 such that a player (not shown) may play gaming device 1803 from outside enclosure 1801. For example, sensors could be included on enclosure 1801 or enclosure 1801 could be a touchscreen. Gaming machine 1803 could be used as a bonus or special game which may be changed depending upon the application. That is, the image displayed on enclosure 1801 could be changed to simulate any type of environment or game depending upon player preference or upon the player identity and demographics as sensed by the video control and projection system as described herein. In one embodiment, conventional gaming device 1803 could include only the internal workings of the device and the housing of a conventional gaming machine may be removed or omitted and replaced by enclosure 1801.

Figure 19:
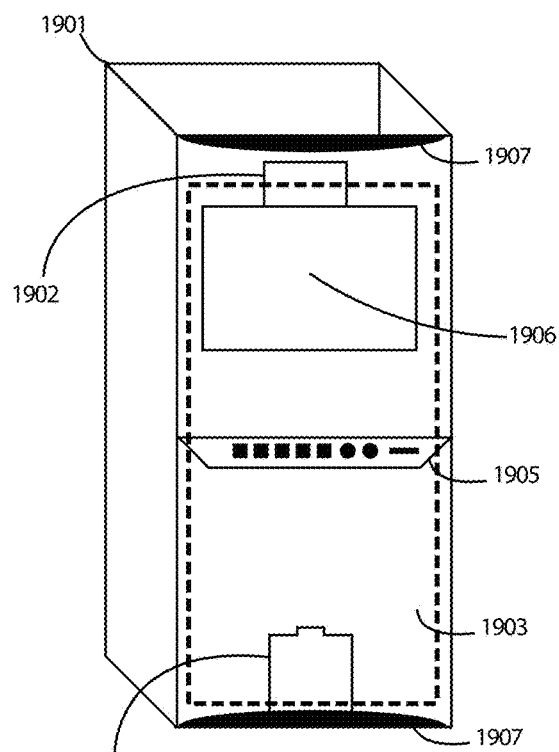
FIG. 19 is a perspective view of an alternate embodiment of an internal projection system enclosing an electronic gaming machine and including input devices.

Referring to FIG. 19, in an alternate embodiment, gaming machine 1903 is shown in cabinet 1901 as in FIG. 17 with one or more projectors 1902 contained therein. Enclosure 1901 may include a touchscreen 1906 and an input device 1905 such as a virtual keypad. A player could play electronic gaming device 1903 through one or both of touchscreen 1906 and/or keypad 1905. One or more sensors 1907 may be included on enclosure 1901 to detect movement such that a player approaching enclosure to play electronic gaming device 1903 may activate the video projection onto enclosure 1901. In one embodiment, gaming device 1903 could include only the internal workings of the device and the external housing of a conventional gaming machine may be removed or omitted and replaced by enclosure 1901.

Figure 20:
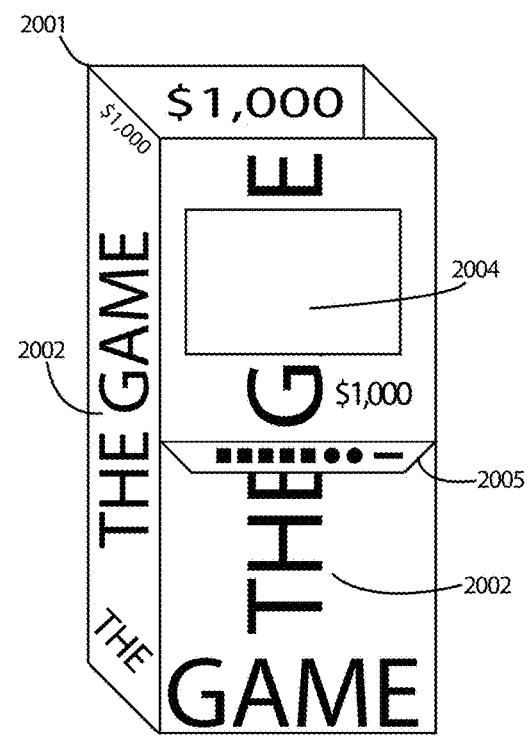
FIG. 20 is a perspective view of an alternate embodiment of an internal projection system enclosing an electronic gaming machine with an internally projected image.

Referring to FIG. 20, the device of FIG. 19 is shown with one or more images 2002 displayed thereon. An electronic gaming device and projectors (both not shown) may be included in enclosure 2001. A player (not shown) may interact with the electronic gaming device through touchscreen 2004 and/or keypad 2005.

Figure 21:
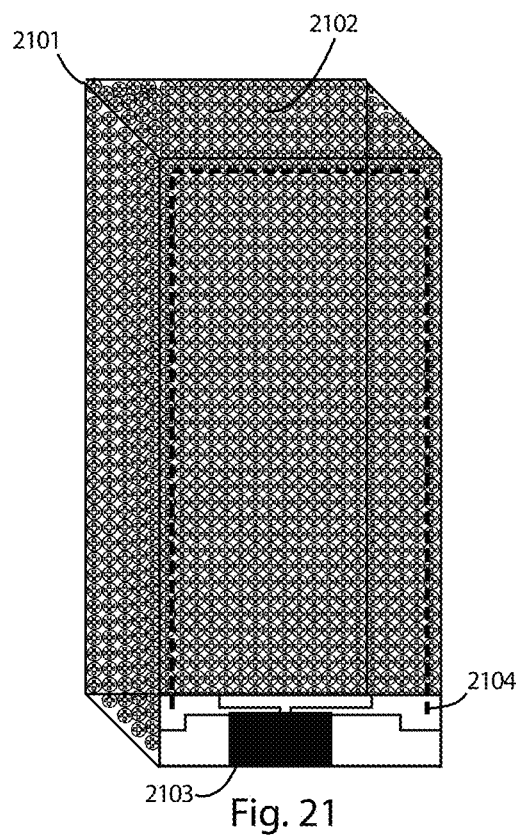
FIG. 21 is a perspective view of an alternate embodiment of an internal projection system enclosing an electronic gaming machine and including video panels.

Referring to FIG. 21, in another embodiment, an enclosure 2101 similar to that of FIG. 17 is shown in another embodiment in which light emitting diode (LED) (including OLED, LCD, CRT and plasma) video panels 2102 are included on or inside enclosure 2101. An electronic gaming device (not shown) may be contained within enclosure 2101 as shown in FIG. 18. A video processor 2103 associated with the video control and projection system described herein may be connected to LED's 2102 to generate images on enclosure 2101. In one embodiment, a conventional gaming device could include only the internal workings of the device and the housing of a conventional gaming machine may be removed or omitted and replaced by enclosure 2101.

Figure 22:
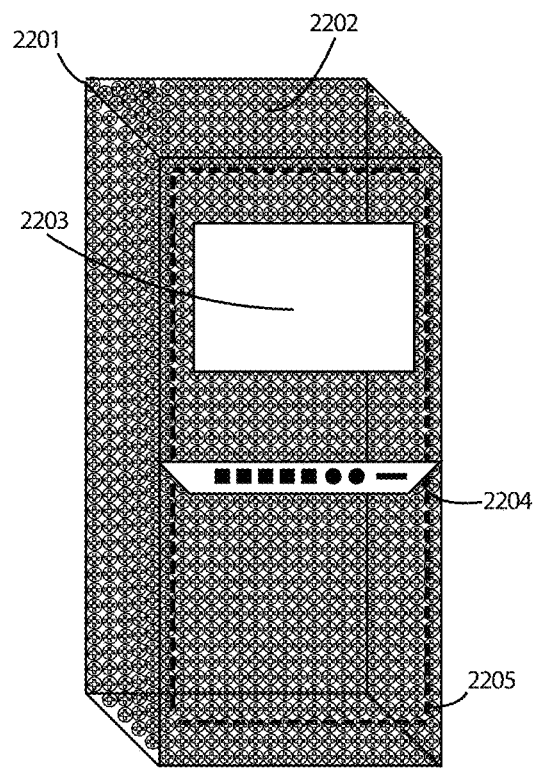
FIG. 22 is a perspective view of an alternate embodiment of an internal projection system enclosing an electronic gaming machine and including video panels and input devices.

Referring to FIG. 22, in another embodiment, an enclosure 2201 similar to enclosure 2101 in FIG. 21 includes a touchscreen 2202 and a keypad 2203. Enclosure 2201 includes an electronic gaming machine (not shown) as described above. In one embodiment, a conventional gaming device could include only the internal workings of the device and the housing of a conventional gaming machine may be removed or omitted and replaced by enclosure 2201.

Figure 23:
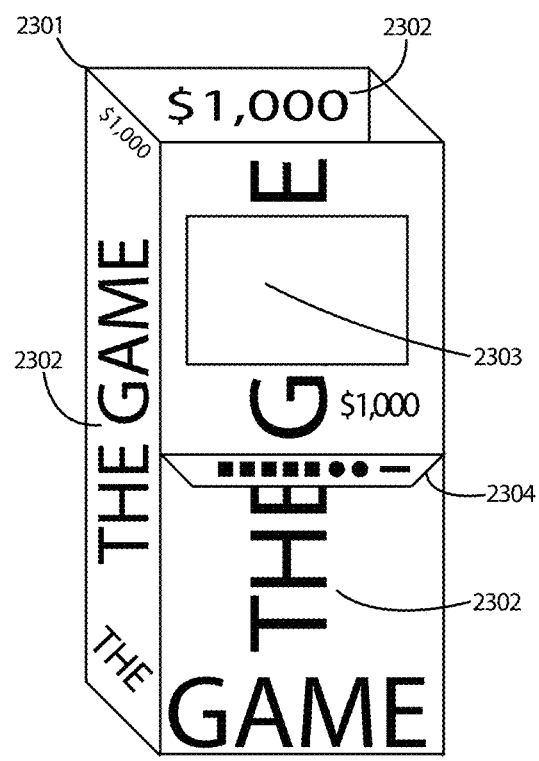
FIG. 23 is a perspective view of an alternate embodiment of an internal projection system enclosing an electronic gaming machine with an internally projected image on video panels.

Referring to FIG. 23, as with FIG. 20, images 2302 may be displayed on enclosure 2301 which includes the LED's as described above with respect to FIGS. 21 and 22. A touchscreen 2303 and keypad 2304 or other input device may be used by a player to play the electronic gaming device contained within enclosure 2301.

Figure 24:
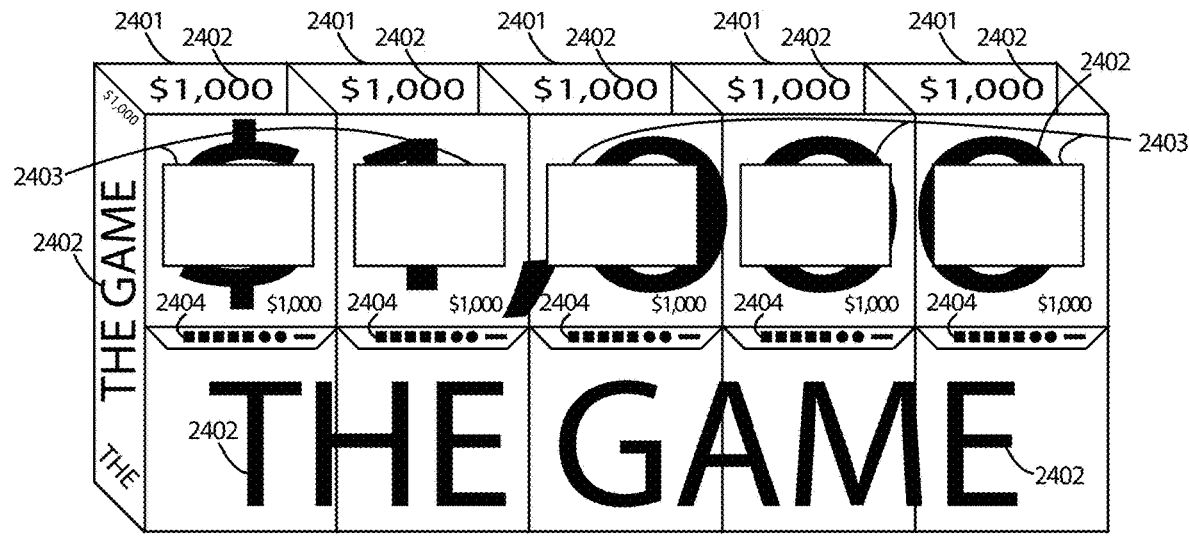
FIG. 24 is a front view of a an alternate embodiment of an internal projection system enclosing a bank of electronic gaming machines.

Referring to FIG. 24, in an alternate embodiment, a plurality of enclosures 2401 such as those described above in FIGS. 17-23 may be placed side by side and the video control and projection system described herein may be used to coordinate the images 2402 on each of enclosures 2401 to project one image conveying a single theme. In this embodiment, the words "The Game" and dollar amount $1000 are conveyed. A touchscreen 2403 and keypad 2404 on each enclosure allows a player to play the electronic gaming machine contained therein.

Figure 25:
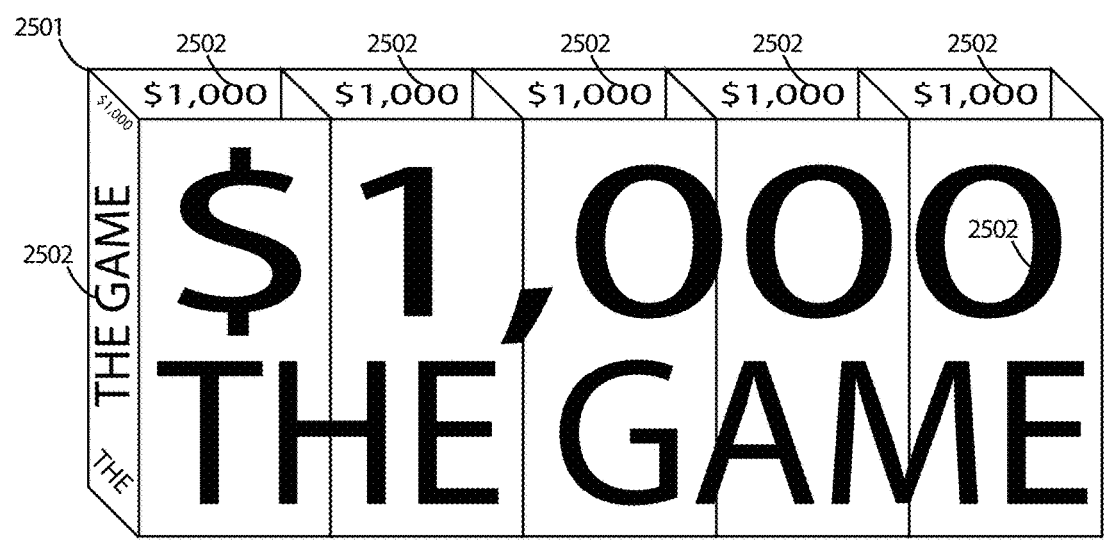
FIG. 25 is a rear view of a an alternate embodiment of an internal projection system projecting an image on a bank of electronic gaming machines.

Referring to FIG. 25, the embodiment of FIG. 24 is shown with images 2502 displayed on the back of enclosures 2501 such that images 2502 convey one unified image. While the image shown is a gaming image, in another embodiment it could be a news or other live video feed or a concert or sporting event. In another embodiment, the video control and projection system described herein could mask the touchscreen 2503 and the keypad 2504 of FIG. 24 such that image 2502 could be displayed on the front of enclosures 2501 to convey the unified image.

Figure 26:
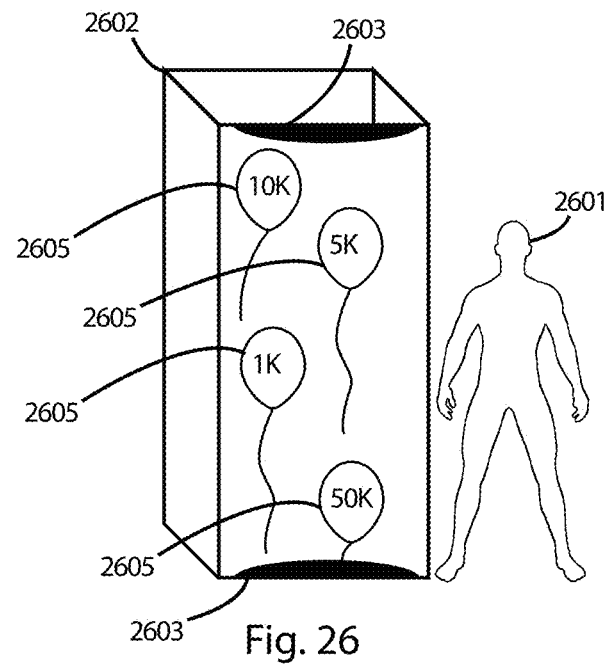
FIG. 26 is a perspective view of an alternate embodiment of an internal projection system enclosing an electronic gaming machine and including motion, tracking and touch sensors and an image.

Referring to FIG. 26, in another embodiment, the rear projection system as described in FIGS. 17-21 and in particular FIG. 19, is employed to generate an image on an enclosure 2602. One or more motion tracking sensors 2603 which may be located on the top or bottom of enclosure as shown or in other locations on enclosure 2602 may be used to allow enclosure 2602 to function as an input device or touchscreen. Images 2605 may be stationary or moving as described herein with pixel movement and player 2601 may touch one of the images to select a bonus game or winning amount. The images may have different amounts as shown and move rapidly and the player may be required to touch one within a predetermined amount of time to receive that monetary or other prize. In lieu of sensors 2503, a touch overlay could be provided on the surface of enclosure 2602 to function as a touchscreen such as touchscreen 1904 in FIG. 19. In another embodiment, the player 2601 may touch an image which directs him or her to another electronic gaming device in the venue. This provides player 2601 with an opportunity to move about in the gaming venue and to play different games and may increase player interest and attention.

Figure 27:
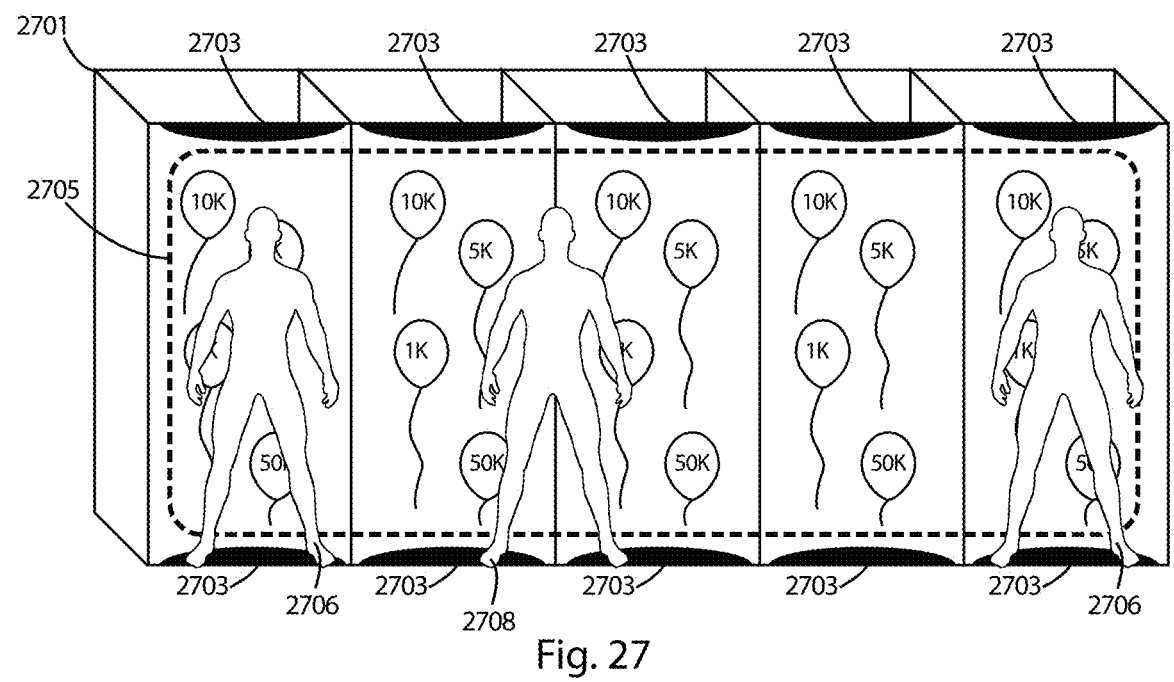
FIG. 27 is a is a front view of a an alternate embodiment of an internal projection system projecting an image on a bank of electronic gaming machines.

Referring to FIG. 27, a perspective view of a plurality of devices as described in FIG. 26 is shown. In this embodiment, each of enclosures 2701 include images which are generated as described above and may be combined into a unified image 2705 as presented to one or more players 2706. A player 2706 may play one electronic gaming machine 2701 and, upon winning or upon the occurrence of another event, may be prompted to move to an adjacent machine as represented by player 2708 to select one of moving images 2705 such as a moving balloon worth 10K (or 5K or 50K etc.) as described above. One or more motion tracking sensors 2703 which may be located on the top or bottom of enclosure as shown or in other locations on enclosure 2701 may be used to allow enclosure 2701 to function as an input device or touchscreen.

Figure 28:
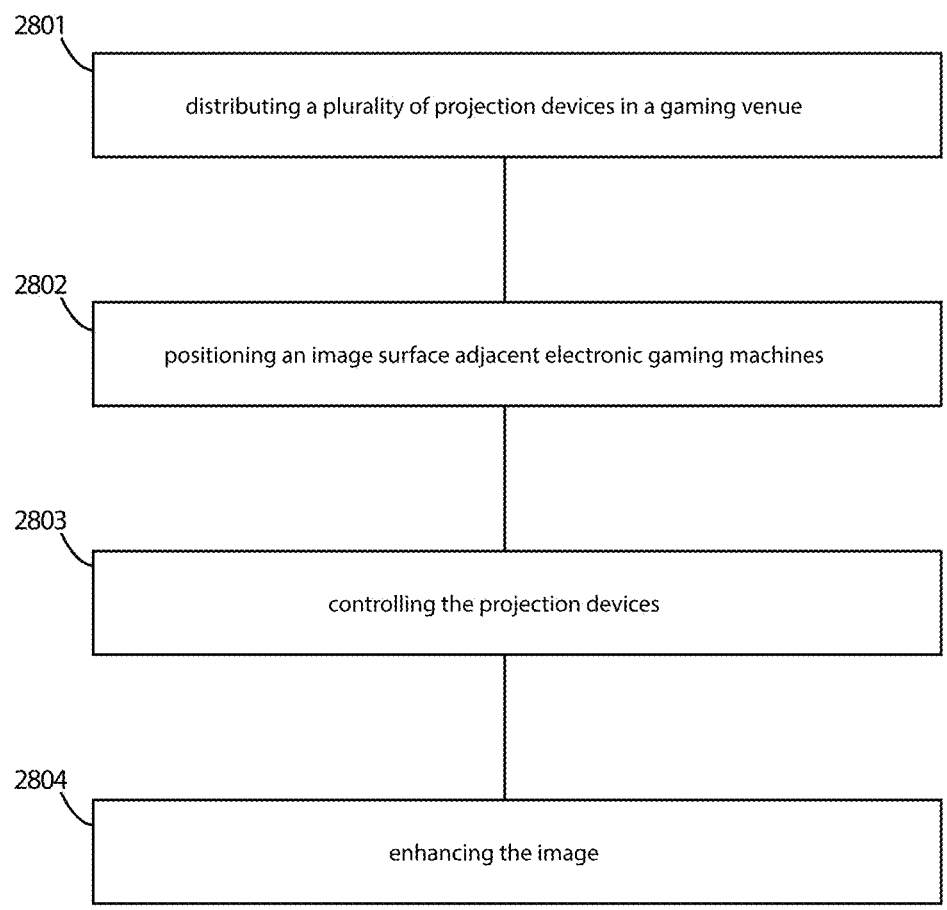
FIG. 28 is a flow chart illustrating the operations for projecting and controlling a video mapping system.

Referring to FIG. 28, a flow chart of a method for generating an image in a gaming establishment venue begins with operation 2801 by distributing a plurality of projection devices in a gaming venue. The projection devices could include video projectors or light sources such as LED's, LCD's, CRT's, plasma and OLED's. In some embodiments, these projection devices may be located within electronic gaming devices. In operation 2802 an image surface such as a light reflecting surface is positioned in the gaming venue adjacent electronic gaming machines. The light reflecting surface may include liquid droplets, a wall of the gaming venue, a flexible cloth or other opaque surface and an object such as an automobile. In other embodiments the image surface may be a transparent housing containing the electronic gaming device so that the image transmitted through the housing conceals the electronic gaming device. In operation 2803, the projection devices are controlled by a system which may include a controller processor connected to a gaming establishment network. The controller may determine which of a variety of images are projected based upon the electronic gaming devices or the player that is playing the devices. In operation 2804, the image is enhanced by at least one of pixel cloning, image blending, pixel scaling, pixel movement, and pixel masking.

Because video output is taken from an approved electronic gaming device or from the gaming establishment network, it does not need to be approved by gaming commissions or regulators in those jurisdictions which have such regulations. Thus a new and enhanced player gaming experience is achieved using an image already approved by gaming jurisdictions and using advanced video and pixel manipulation inside a server system to produce that modified image. The disclosed embodiments use a video output from any gaming signage system in a gaming establishment and manipulate it to create a more enhanced player gaming experience. Because the embodiments use gaming approved signage systems, and only manipulating the video signal, no current or future gaming jurisdiction approved devices are necessary thus simplifying the implementation process for the embodiments disclosed herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

I claim:

1. A video system comprising:
   an optically transparent enclosure;
   an electronic gaming machine attached to the enclosure;
   an image control system electromagnetically connected to a gaming network associated with one of a gaming venue or a stored media database, to select a background video or a background image and at least one of a different video or a different image;
   at least one of the selected background video, the selected background image, the selected different video, or the selected different image selected from at least one of the gaming network, a live video feed, a dynamic data stream, a three dimensional graphic, or the stored media database;
   at least one of the selected background video, the selected background image, the selected different video, or the selected different image further coordinated with either the electronic gaming machine or a player of the electronic gaming machine, or both;
   a video server processor connected to the image control system to generate a plurality of control video feeds, each of the plurality of control video feeds represents at least one of the selected background video, the selected background image, the selected different video, or the selected different image;
   an image generating system to distribute the plurality of control video feeds to the electronic gaming machine; and
   wherein the distributed control video feeds employing pixel manipulation including image blending, pixel movement and pixel relocation, such that the selected different video or the selected different image, the background image or the selected background video are included in a completed image or a completed video which is displayed by the image generating system on the enclosure to conceal the electronic gaming machine.

2. The video system of claim 1 further comprising an audio system connected to the image control system.

3. The video system of claim 1 wherein the stored media database includes information associated with the player.

4. The video system of claim 1 wherein the image generating system includes a video projector in the enclosure.

5. The video system of claim 1 including a plurality of light sources adjacent to the enclosure.

6. The video system of claim 5 wherein the plurality of light sources comprise at least one of LED's, LCD's, CRT's, plasma or OLED's.

7. The video system of claim 1 wherein the pixel manipulation further includes atleast one of: pixel cloning, pixel scaling or pixel masking.

8. The video system of claim 1 further including plurality of the selected different videos and/or the selected different images at least partially layered over each other and the selected background video or the selected background image.

9. A video system comprising:
   a plurality of optically transparent enclosures;
   a plurality of electronic gaming machines in a gaming venue, one of the electronic gaming machines being attached to one of the enclosures;
   an image control system electromagnetically connected to a gaming network associated with a gaming venue or a stored media database to select a background video or a background image and at least one of a different video or a different image from at least one of the gaming network, a live video feed, a dynamic data stream, a three dimensional graphic, or the stored media database;
   at least one of the selected background video, the selected background image, the selected different video, or the different image coordinated with one or both of either the plurality of electronic gaming machines or the player of the at least one of the plurality of electronic gaming machines, or both;
   a video server processor connected to the image control system to generate a plurality of control video feeds, wherein each of the plurality of control video feeds represents at least one of the selected background video, the selectedbackground image, the selected different video, or the selected different image; and
   an image generating system to distribute the plurality of control video feeds to the plurality of electronic gaming machines;
   the distributed plurality of control video feeds employing pixel manipulation including image blending, pixel movement and pixel relocation, such that the selected different video, the selected different image, the selected background image, or the selected background video are included in a completed image or a completed video which is displayed by the image generating system on the enclosures to conceal the plurality of electronic gaming machines.

10. The video system of claim 9 including a plurality of light sources adjacent to the enclosures, wherein the plurality of light sources comprise at least one of LED's, LCD's, CRT's, plasma or OLED's.

11. The video system of claim 9 further comprising an audio system connected to the image control system.

12. The video system of claim 9 wherein the stored media database includes information associated with the player.

13. The video system of claim 9 wherein the pixel manipulation further includes at least one of: pixel cloning, pixel scaling or pixel masking.

14. The video system of claim 9 further including a plurality of the selected different videos and/or the selected different images at least partially layered over each other and the selected background video or the selected background image.

15. A method for generating an image comprising the operations of:
providing an optically transparent enclosure attached to an electronic gaming machine;
selecting, by an image control system electromagnetically connected to a gaming network associated with a gaming venue or a stored media database, a background video or background image and at least one different video or image selected from one or more at least one of a gaming network, a live video feed, a dynamic data stream, a three dimensional graphic, or a stored mediadatabase;
associating at least one of the background video, the background image, or the at least one different image with either the electronic gaming machine, or a player of the electronic gaming machine, or both;
generating, by a video server processor connected to the image control system, a plurality of control video feeds, each of the plurality of control video feeds representing at least one of the selected background video, the selected background image, the selected different video, or the selected different image;
distributing the plurality of control video feeds to an image generating system;
employing pixel manipulation including image blending, pixel movement, and pixel relocation such that the selected different video, the selected different image, the selected background image, or the selected background video are included in a completed image or a completed video; and
displaying, by the image generating system, the completed video or the completed image on the enclosure to conceal the electronic gaming machine.

16. The method of claim 15 wherein the pixel manipulation further includes at leastone of: pixel cloning, pixel scaling or pixel masking.

17. The method of claim 15 including the operation of at least partially layering a plurality of the selected different videos and/or the selected different images over each other, the selected background video, or the selected background image.

18. The method of claim 15 wherein the operation of displaying includes generatinga holographic image.

19. The method of claim 15 including the operation of disposing a video projector in the enclosure.

20. The method of claim 15 further including the operation of sending an audiosignal to and/or from the player.

* * * * *